(12) United States Patent
Joao

(10) Patent No.: US 9,760,864 B2
(45) Date of Patent: *Sep. 12, 2017

(54) APPARATUS AND METHOD FOR PROVIDING JOB SEARCHING SERVICES, RECRUITMENT SERVICES AND/OR RECRUITMENT-RELATED SERVICES

(71) Applicant: Raymond Anthony Joao, Yonkers, NY (US)

(72) Inventor: Raymond Anthony Joao, Yonkers, NY (US)

(73) Assignee: GTJ VENTURES, LLC, Yonkers, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,946

(22) Filed: Aug. 29, 2015

(65) Prior Publication Data

US 2015/0371192 A1    Dec. 24, 2015

Related U.S. Application Data

(63) Continuation of application No. 12/315,124, filed on Nov. 29, 2008, now Pat. No. 9,152,943, which is a continuation of application No. 10/691,796, filed on Oct. 23, 2003, now Pat. No. 7,490,086, which is a continuation of application No. 09/612,528, filed on Jul. 7, 2000, now Pat. No. 6,662,194.

(60) Provisional application No. 60/146,776, filed on Jul. 31, 1999.

(51) Int. Cl.
G06F 17/30    (2006.01)
G06Q 10/10    (2012.01)
G06Q 30/02    (2012.01)

(52) U.S. Cl.
CPC ......... *G06Q 10/1053* (2013.01); *G06Q 10/10* (2013.01); *G06Q 10/105* (2013.01); *G06Q 30/02* (2013.01); *Y10S 707/99933* (2013.01); *Y10S 707/99934* (2013.01); *Y10S 707/99935* (2013.01); *Y10S 707/99944* (2013.01); *Y10S 707/99945* (2013.01); *Y10S 707/99948* (2013.01)

(58) Field of Classification Search
CPC .............. G06Q 10/105; G06Q 10/1053; Y10S 707/99933
USPC ........................................................ 707/758
See application file for complete search history.

(56) References Cited

U.S. PATENT DOCUMENTS 5,164,897 A * 11/1992 Clark ..................... G06Q 99/00
                                                 705/321
5,758,324 A *  5/1998 Hartman ........... G06F 17/30011
                                                 705/1.1
5,832,497 A * 11/1998 Taylor ................... G06Q 10/10
(Continued)

*Primary Examiner* — Jean M Corrielus
(74) *Attorney, Agent, or Firm* — Raymond A. Joao, Esq.

(57) ABSTRACT

An apparatus, including a memory device for storing work schedule information or scheduling information for an individual, a transmitter for transmitting a job search request to a computer, wherein the computer is specially programmed for processing the job search request, for generating a message containing information regarding a job opening, a position, an assignment, a contract, or a project, and for transmitting the message to the apparatus in response to the job search request; a receiver for receiving the message; and a display for displaying at least some of the information contained in the message.

21 Claims, 16 Drawing Sheets

(56) References Cited

U.S. PATENT DOCUMENTS

| | | | | |
|---|---|---|---|---|
| 5,862,223 A | * | 1/1999 | Walker | G06Q 10/06311 705/50 |
| 5,884,270 A | * | 3/1999 | Walker | G06Q 10/1053 379/93.12 |
| 5,884,272 A | * | 3/1999 | Walker | G06Q 30/0615 379/93.12 |
| 5,978,768 A | * | 11/1999 | McGovern | G06Q 10/1053 705/321 |
| 6,157,808 A | * | 12/2000 | Hollingsworth | G09B 7/02 434/219 |
| 6,266,659 B1 | * | 7/2001 | Nadkarni | G06F 17/30389 705/7.14 |
| 6,370,510 B1 | * | 4/2002 | McGovern | G06Q 10/10 705/321 |
| 6,381,592 B1 | * | 4/2002 | Reuning | G06Q 10/06 |
| 6,398,556 B1 | * | 6/2002 | Ho | G09B 7/04 434/118 |
| 6,408,337 B1 | * | 6/2002 | Dietz | G06Q 10/06 709/229 |
| 6,409,514 B1 | * | 6/2002 | Bull | G09B 5/02 434/118 |
| 6,466,914 B2 | * | 10/2002 | Mitsuoka | G06Q 10/063112 705/37 |
| 6,718,340 B1 | * | 4/2004 | Hartman | G06F 17/30011 |
| 6,873,964 B1 | * | 3/2005 | Williams | G06Q 10/063112 705/321 |
| 7,054,821 B1 | * | 5/2006 | Rosenthal | G06Q 10/06 705/348 |
| 7,305,347 B1 | * | 12/2007 | Joao | G06Q 10/1057 705/35 |
| 7,523,045 B1 | * | 4/2009 | Walker | G06Q 10/063112 705/7.14 |
| 2001/0042000 A1 | * | 11/2001 | Defoor, Jr. | G06Q 10/063112 705/7.14 |
| 2002/0002476 A1 | * | 1/2002 | Mitsuoka | G06Q 10/063112 705/7.14 |
| 2002/0152316 A1 | * | 10/2002 | Dietz | G06Q 10/10 709/229 |
| 2005/0010467 A1 | * | 1/2005 | Dietz | G06Q 10/10 709/229 |

* cited by examiner

APPARATUS AND METHOD FOR PROVIDING JOB SEARCHING SERVICES, RECRUITMENT SERVICES AND/OR RECRUITMENT-RELATED SERVICES

RELATED APPLICATIONS

This is a continuation application of U.S. patent application Ser. No. 12/315,124, filed Nov. 29, 2008, and entitled "APPARATUS AND METHOD FOR PROVIDING JOB SEARCHING SERVICES, RECRUITMENT SERVICES AND/OR RECRUITMENT-RELATED SERVICES", which, in turn, is a continuation application of U.S. patent application Ser. No. 10/691,796, filed Oct. 23, 2003, and entitled "APPARATUS AND METHOD FOR PROVIDING JOB SEARCHING SERVICES, RECRUITMENT SERVICES AND/OR RECRUITMENT-RELATED SERVICES", now U.S. Pat. No. 7,490,086, which, in turn, is a continuation application of U.S. patent application Ser. No. 09/612,528, filed on Jul. 7, 2000, and entitled "APPARATUS AND METHOD FOR PROVIDING JOB SEARCHING SERVICES, RECRUITMENT SERVICES AND/OR RECRUITMENT-RELATED SERVICES", now U.S. Pat. No. 6,662,194, the subject matter of which are hereby incorporated by reference herein in their entirety. U.S. patent application Ser. No. 09/612,528, filed on Jul. 7, 2000, claims the benefit of priority of U.S. Provisional Patent Application Ser. No. 60/146,776, filed Jul. 31, 1999, and entitled "APPARATUS AND METHOD FOR PROVIDING JOB SEARCHING SERVICES, RECRUITMENT SERVICES AND/OR RECRUITMENT-RELATED SERVICES", the subject matter of which is hereby incorporated by reference herein in their entirety.

FIELD OF THE INVENTION

The present invention is directed to an apparatus and a method for providing job searching services, recruitment services and/or recruitment-related services and, in particular, to an apparatus and a method for providing job searching services, recruitment services and/or recruitment-related services as they may relate to individuals, independent contractors, freelancers, employers and/or hiring entities, in a network environment.

BACKGROUND OF THE INVENTION

Individuals, independent contractors, and/or freelancers, can expend great efforts and a great deal of time in job searching efforts. Individuals, independent contractors, and/or freelancers, typically place a great deal of importance on their job searching efforts, on efforts directed to securing employment, both permanently and/or temporarily as a temporary employee and/or "contract" employee, and/or on efforts directed to obtaining and/or securing projects and/or assignments.

Employers and/or hiring entities require that they have a satisfactory workforce in order to meet the demands of doing business. In this regard, employers and/or hiring entities very often need to find and/or recruit new employees, replace former employees, find employees with new skills to meet their business needs, and/or obtain the services of temporary workers, independent contractors, and/or freelancers.

Growing businesses and markets have been created by the need for individuals, independent contractors, and/or freelancers to find and/or to secure jobs, employment, projects and/or assignments, and by the need of employers and/or hiring entities to recruit and hire new employees, independent contractors, and/or freelancers. These businesses and markets include employment agencies, recruiters, so-called "headhunters", employment and/or career consultants, temporary employment agencies, personal agents, personal managers, and/or other intermediaries, who or which, respectively, bring the respective parties together and/or assist them in obtaining introductions, establishing a dialog between parties, reaching agreement on, and/or establishing an employment, an independent contractor, and/or a freelance relationship.

Job searching activities and recruitment activities typically require efforts in introducing parties to one another, pre-screening the parties prior to, and/or subsequent to, an introduction, acting as an information gathering entity for a party, exchanging information in order to determine if a relationship is appropriate and/or desirable, negotiating a deal, and/or consummating a deal between the respective parties. While individuals and/or employers and/or hiring entities can act on their own behalf during most of the process, one of the parties may typically enlist the efforts of an employment agency or agencies, a recruiter(s), a so-called "headhunter(s)", an employment and/or career consultant(s), a temporary employment agency or agencies, a personal agent(s), a personal manager(s), and/or another intermediary or intermediaries, sometimes at great expense.

The enlistment of employment agencies, recruiters, so-called "headhunters", employment and/or career consultants, temporary employment agencies, personal agents, personal managers, and/or other intermediaries, can be costly and can lead to job search efforts and/or recruitment efforts which may be limited in breadth and/or scope by the personal and/or individual contacts, limitations and/or constraints associated with the employment agency, recruiter, so-called "headhunter", employment and/or career consultant, temporary employment agency, personal agent, personal manager, and/or other intermediary.

In this regard, job search efforts and/or recruitment efforts may be limited, thereby depriving an individual and/or an employer and/or hiring entity of being introduced to the best possible candidates. In some instances, an employer and/or hiring entity may forgo access to certain candidates simply because they cannot and/or refuse to enlist the efforts of a recruiter and/or other intermediary.

Job searching efforts and recruitment efforts may be limited by and/or be constrained by limited personal contacts, geographical constraints, monetary constraints, and/or time constraints. Oftentimes, individuals, employers and/or hiring entities, do not have the resources to conduct their own respective job searching efforts or recruitment efforts. The enlistment of employment agencies, recruiters, so-called "headhunters", employment and/or career consultants, temporary employment agencies, personal agents, personal managers, and/or other intermediaries, may not be sufficient to overcome these limitations and/or constraints, particularly, if the respective employment agency or agencies, recruiter(s), so-called "headhunter(s)", employment and/or career consultant(s), temporary employment agency or agencies, personal agent(s), personal manager(s) and/or other intermediary or intermediaries, are working with similar limitations and/or constraints.

The job search process and/or the recruitment process can typically be rendered more difficult in instances when additional information may be requested by one or by both of the parties concerning a counterpart. This typically results in time delays and/or additional expense to the party having to comply with such a request.

Job searching efforts and/or recruitment efforts may further be rendered more difficult when the parties are not properly pre-screened, thereby resulting in wasted time and effort, and/or when the parties are not properly informed as to the needs and/or demands of a counterpart. The needs and/or demands can include job description, job needs, project description, assignment description, salary, compensation, and/or other related information. The failure to pre-screen the parties and/or to conduct a dialog and/or initiate interviews and/or discussions when the parties may be so far apart regarding their respective needs, requests and/or expectations, for example, those involving job duties and/or salary, can result in wasted time and effort.

Confidentiality is typically another concern in job searching activities and/or in recruitment activities. Individuals, employees, and/or hiring entities may have an interest in, and/or a desire for, maintaining confidentiality during at least some initial stages of any job search and/or recruitment effort. In some instances, once an initial interest is expressed, any confidentiality which may have existed may be lost for the remainder of the process. Sometimes, it may be desirable for an individual, an employer and/or hiring entity, to retain at least some level of confidentiality and/or anonymity further into the job search and/or recruitment process. In this manner, at least some confidentiality and/or anonymity can be preserved, especially if a deal between the parties is not ultimately reached.

Job searching activities and/or recruitment activities may be far too widespread and may be far too important to be limited by the above-described limitations and/or constraints. Individuals, employers and/or hiring entities would be better served by a system which overcomes the shortcomings of the prior art.

SUMMARY OF THE INVENTION

The apparatus and method of the present invention overcomes the shortcomings of the prior art and provides an apparatus and a method for providing job searching services, recruitment services and/or recruitment-related services. The present invention utilizes the technologies and advances in information technology and in communication technology in order to provide these services in a network environment.

The present invention is directed to an apparatus and a method for providing job searching services, recruitment services and/or recruitment-related services, for the respective individuals, employees, independent contractors, freelancers, employers and/or hiring entities, described herein in a network environment. The present invention also provides a centralized apparatus, which can also serve as a clearinghouse, which provides job searching services, recruitment services, and/or recruitment-related services, as well as any of the services and/or activities described herein.

The apparatus and method of the present invention can be utilized by individuals, independent contractors, freelancers, and/or other entities, desirous of securing a job, a position, a project, an assignment, and/or an employment relationship, either permanent and/or temporary, with an employer and/or a hiring entity. The apparatus and method of the present invention can also be utilized by employers and/or by other hiring entities desirous of securing the services of an individual, an employee, an independent contractor, and/or freelancer, either permanently and/or temporarily.

The present invention can also be utilized by an employment agency, a recruiter, a so-called "headhunter", or other intermediary, in order to assist and/or to act on behalf of any of the individuals, employers and/or hiring entities described herein. The present invention can also be utilized in order to provide agency services for any of the herein described parties, i.e., individual, employees, independent contractors, freelancers, employers, hiring entities, recruiters, headhunters, etc.

The apparatus and method of the present invention can be utilized in a network environment in order to effectuate any of the services described herein on, or over, any communication network.

The apparatus can include a central processing computer or server computer, at least one or more individual computers and at least one or more employer computers. Each of the herein-described computers may communicate with any and all of the computers which are utilized in conjunction with the apparatus of the present invention. The present invention may be utilized in any communication network such as the Internet, the World Wide Web, a telecommunications network, and/or any other communication network described herein and/or otherwise.

Each of the central processing computer(s), the individual computers, and/or the employer computers can include any and/or all components, peripherals, hardware, and/or software, for facilitating the use thereof in a manner consistent with the present invention as described herein.

The central processing computer may also include, and/or be linked to, a database(s) and/or other storage and/or memory device(s) for storing any and/or all of the data and/or information described as being utilized, and/or which may be utilized, in conjunction with the present invention.

The present invention provides job search services, recruitment services, and/or recruitment-related services, while preserving confidentiality among and/or between the parties and/or between the parties and third parties, and may further provide for varying layers of confidentiality for the parties involved. The present invention can also provide enhanced information services for the parties utilizing same, including but not limited to, links, hyperlinks, and/or other pointing and/or linking devices for linking a user to additional and/or supplemental information concerning any of the individuals, employers, hiring entities, and/or other parties, involved in a dialog, negotiations and/or discussions.

The data and/or information utilized in conjunction with the present invention can also be utilized by the various individuals, employers, hiring entities, contractors, applicants, recruiters, headhunters, third party intermediaries, and/or the operator and/or the administrator of the apparatus, and can be uploaded to, downloaded from, and/or be stored and/or be resident on any of the central processing computer(s), the individual computer(s), and/or the employer computer(s).

The apparatus and method of the present invention can be utilized to perform various job-searching services, recruitment services and/or recruitment-related services and/or functions. The present invention may be utilized by an individual, a prospective employee, an independent contractor, a freelancer, either permanent or temporary, to find or to locate a job, a position, a project and/or an assignment, for which they may wish to apply. The present invention can also be utilized by an employer and/or hiring entity to recruit and/or to search for, an individual, a prospective employee, an independent contractor, and/or a freelancer, either permanent or temporary.

The present invention can also be utilized by a recruiter, a headhunter, and/or a third party intermediary, in order to assist an individual, a prospective employee, an independent contractor, and/or a freelancer, in searching for a job, a position, a project, and/or an assignment, and/or for assisting an employer and/or a hiring entity in searching for, and/or for recruiting an individual, a prospective employee, an independent contractor, and/or a freelancer, in order to fill a hiring and/or other need.

The present invention may also be utilized to notify an individual, a prospective employee, an independent contractor, and/or freelancer, of the existence and/or the availability of an opportunity for and/or related to a job, a position, a project and/or an assignment. The present invention may also be utilized to notify an employer and/or a hiring entity of the availability of an individual, a prospective employee, an independent contractor, and/or freelancer.

Any and/or all of the communications between the parties may be effected via electronic message transmission, e-mail, electronic forms submission, a telephone call, telephone messaging, facsimile messaging, pager and/or beeper messaging, physical mailing, and/or via any other appropriate method, means and/or mechanism.

Employers and/or other hiring entities can post data and/or list information regarding jobs, employment positions, temporary positions, assignments, freelance assignments, contracting assignments and/or jobs, as well as any other assignments, projects and/or efforts which require and/or which may require the services of an individual, an employee, an independent contractor, a freelancer, a temporary employee, etc, with the present invention.

Similarly, individuals, job applicants, prospective employees, independent contractors, temporary workers, and/or freelancers, etc., can also post and/or list data and/or information regarding themselves with the present invention.

The present invention can be utilized in order to allow employers and/or hiring entities to bid for individuals, employees, independent contractors, and/or freelancers. The present can also be utilized in order to allow individuals and/or their agents and/or managers to auction and/or offer their services to employers and/or to hiring entities.

The present invention can be utilized for managing work schedules, and/or for maintaining information regarding work schedules for an individual or entity, including, but not limited to any job applicant, temporary worker, independent contractor, and/or freelancer. An employer and/or hiring entity can obtain information regarding the work, temporary assignment, and/or project or assignment, schedules for any individual or entity utilizing the present invention. An employer and/or hiring entity may hire and/or reserve the time of and/or the services of, the individual and/or entity via the present invention.

The present invention can also provide an individual and/or an employer and/or hiring entity with data and/or information regarding the latest developments and/or current developments in the employment and/or recruiting fields, including, but not limited to, growth areas, demand information for certain jobs and/or professions, salary surveys, etc. In this manner, the present invention can provide information for allowing an individual, an employer and/or hiring entity to determine the state of the job market and/or to utilize this information in any appropriate manner so as to minimize the time, effort and/or expense of job searching efforts and/or recruitment efforts.

The present invention can also provide notification to any of the individuals, employers and/or hiring entities, when and/or if information is being and/or has been requested about he, she or it. The present invention can also provide the identity of the party requesting the information to the respective individual, employer and/or hiring entity.

The present invention can also provide for the blockage of any access, authorized and/or unauthorized, to any of the data and/or information utilized in conjunction with the present invention and/or concerning any individual, entity, employer, and/or hiring entity, utilizing the present invention. The present invention can also provide any data and/or information specifically, generically, generally, such as for a group, and/or statistically and/or in any other manner.

The present invention can also be utilized so as to prevent certain individuals and/or entities, employers and/or hiring entities, from accessing the data and/or information about any other individual, entity, employer, and/or hiring entity.

The operation of the present invention may be triggered by any type of pre-specified event and/or occurrence which may include a new individual listing, a new employer and/or hiring entity listing, a departure of an individual from an employer, the completion of a job, project and/or assignment, changes in an economic factor(s), changes in a market factor(s), an increase in an unemployment rate, the unemployment of an individual, a detected need for jobs having a certain skill(s), and/or any other event, situation, and/or any other occurrence which may be deemed to have some relationship and/or effect related to job searching efforts and/or recruitment efforts.

The apparatus and method of the present invention can also be utilized for performing and/or for facilitating the provision of recruitment services for schools, colleges, universities, and/or any organizations of any kind.

The apparatus of the present invention can also be programmed in order to be self-activating and/or activated automatically.

The apparatus of the present invention can also be programmed in order to generate and/or transmit any of the e-mails, electronic message transmissions, electronic notification transmissions, and/or any of the communications, described herein between any of the parties utilizing the present invention.

The present invention can be utilized in conjunction with intelligent agents, software agents and/or mobile agents, in order to provide for these respective agents to act for, or on behalf of, a respective party.

The present invention can also be utilized in order to generate electronic catalogs and/or electronic coupons for advertising and/or for publicizing the availability of individuals, independent contractors, and/or freelancers, for work, and/or for advertising and/or publicizing jobs, employment positions, projects and/or assignments, which employers and/or hiring entities are seeking to fill.

The present invention can also be utilized in order to monitor, record and/or keep track of, all offers and/or rejections involving any and all jobs, employment positions, projects and/or assignments, which occur in conjunction with and/or via use of the present invention. The information compiled can be provided to individuals, employers, and/or recruiters for use in any appropriate and/or suitable manner.

The present invention, can also store individual and/or employer data and/or information with various and/or varying levels of specificity and/or confidentiality.

The apparatus and method of the present invention can be utilized as an electronic and/or network-based recruiting apparatus and/or clearinghouse. The present invention can be utilized in order to reduce recruiting costs and so-called headhunter fees to employers as well as job search efforts and/or expenses to individuals. The present invention provides an apparatus and a method for eliminating intermediaries and/or unnecessary efforts and/or expense involved in job search and/or recruitment processes for any of the individuals, employers and/or hiring entities described herein.

The present invention can also be utilized in conjunction with the bartering and/or trading of services between parties, such as individuals, employers, and/or hiring entities.

The present invention also provides an apparatus and a method for providing enhanced confidentiality during the job-search, recruitment, and/or related interactions, negotiations and/or other dealings between the parties involved in same. The present invention can monitor and/or record any interaction between any of the parties which utilize the present invention.

The present invention can also be utilized in conjunction with job searches and/or recruiting efforts for any kind of job, profession, employment position, project, and/or assignment, and/or for any permanent, temporary, independent contractor, and/or freelance, job, employment position, project, and/or assignment.

The present invention can utilize electronic commerce technologies and security methods, techniques and technologies.

Accordingly, it is an object of the present invention to provide an apparatus and a method for providing job search services, recruitment services, and/or recruitment-related services.

It is another object of the present invention to provide an apparatus and a method for providing job search services, recruitment services, and/or recruitment-related services, in a network environment.

It is still another object of the present invention to provide an apparatus and a method for providing job search services, recruitment services, and/or recruitment-related services, on and/or over the Internet, the World Wide Web, and/or any other communication network.

It is yet another object of the present invention to provide an apparatus and a method for providing job searching services, recruitment services, and/or recruitment-related services, which provides links to various data and/or information which may be requested, required, and/or desired, by the respective parties involved in job searching activities and/or in recruitment activities.

It is another object of the present invention to provide an apparatus and a method for providing job searching services, recruitment services, and/or recruitment-related services, which utilizes databases which can be linked to external information sources.

It is still another object of the present invention to provide an apparatus and a method for providing job searching services, recruitment services, and/or recruitment-related services, which facilitates the posting of data and/or information by respective individuals and/or employers and/or hiring entities.

It is yet another object of the present invention to provide an apparatus and a method for providing job searching services, recruitment services and/or recruitment-related services, which allows an individual to perform job searches.

It is another object of the present invention to provide an apparatus and a method for providing job searching services, recruitment services and/or recruitment-related services, which allows an employer and/or hiring entity to perform recruitment searches.

It is still another object of the present invention to provide an apparatus and a method for providing job searching services, recruitment services, and/or recruitment-related services, which notifies an individual of job and/or employment opportunities which may be of interest to the individual when same become available.

It is yet another object of the present invention to provide an apparatus and a method for providing job searching services, recruitment services, and/or recruitment-related services, which notifies an employer and/or hiring entity of individuals, prospective employees, independent contractors, permanent workers, temporary workers, and/or freelancers, who or which may be of interest to the employer and/or hiring entity when these individuals and/or entities become available.

It is another object of the present invention to provide an apparatus and a method for providing job searching services, recruitment services, and/or recruitment-related services, which utilizes data and/or information which is specific, generic, and/or general, to an individual, to an employer, and/or to hiring entity.

It is still another object of the present invention to provide an apparatus and a method for providing job searching services, recruitment services, and/or recruitment-related services, which facilitates providing notification to an employer and/or hiring entity when a recruitment-related opportunity arises.

It is yet another object of the present invention to provide an apparatus and a method for providing job searching services, recruitment services, and/or recruitment-related services, which facilitates providing notification to an individual when an employment-related opportunity arises.

It is another object of the present invention to provide an apparatus and a method for providing job searching services, recruitment services, and/or recruitment-related services, which provides for the securing and/or the reserving of services of an individual, an independent contractor, and/or a freelancer.

It is still another object of the present invention to provide an apparatus and a method for providing job-searching services, recruitment services, and/or recruitment-related services, which provides notification of the availability of an individual, a prospective employee, a job applicant, an independent contractor, a temporary worker, and/or a freelancer, for a job, position, project, or assignment.

It is yet another object of the present invention to provide an apparatus and a method for providing job-searching services, recruitment services, and/or recruitment-related services, which provides notification of the availability of a job, an employment position, a project, and/or an assignment, with an employer and/or hiring entity.

It is another object of the present invention to provide an apparatus and a method of the providing job-searching services, recruitment services, and/or recruitment-related services, which utilizes electronic messages and/or e-mail messages which contain links to information and/or information sources which may be utilized in providing said information.

It is still another object of the present invention to provide an apparatus and a method for providing job searching services, recruitment services, and/or recruitment-related services, which provides for bidding and/or auctioning activities regarding said services.

It is yet another object of the present invention to provide an apparatus and a method for providing job searching services, recruitment services, and/or recruitment-related services, which provides scheduling services and/or schedule management services for an individual, an independent contractor, a freelancer, an employer and/or hiring entity.

It is another object of the present invention to provide an apparatus and a method for providing job searching services, recruitment services, and/or recruitment-related services, which provides information regarding developments related to the job-search and/or recruitment fields.

It is still another object of the present invention to provide an apparatus and a method for providing job searching services, recruitment services, and/or recruitment-related services, which provides notification to an individual, an independent contractor, a freelancer, and an employer and/or hiring entity, when data and/or information has been requested about them.

It is yet another object of the present invention to provide an apparatus and a method for providing job searching services, recruitment services, and/or recruitment-related services, which can be utilized by an individual, an independent contractor, a freelancer, an employer and/or hiring entity, and/or a party acting on behalf of same.

It is another object of the present invention to provide an apparatus and a method for providing job searching services, recruitment services, and/or recruitment-related services, which prevents access to certain data and/or information by certain parties.

It is still another object of the present invention to provide an apparatus and a method for providing job searching services, recruitment services and/or recruitment-related services, which can be programmed to be self-activating and/or be activated automatically.

It is yet another object of the present invention to provide an apparatus and a method for providing job searching services, recruitment services and/or recruitment-related services which generates electronic messages, e-mail messages, telephone calls, pager calls, pager messages, and/or other communication messages, automatically.

It is another object of the present invention to provide an apparatus and a method for providing job searching services, recruitment services, and/or recruitment-related services, which utilizes intelligent agents, software agents, and/or mobile agents, for providing various services for, and/or for taking action on behalf of, a respective party.

It is still another object of the present invention to provide an apparatus and a method for providing job searching services, recruitment services, and/or recruitment-related services, which provides links and/or hyperlinks to information, products and/or services related thereto.

It is yet another object of the present invention to provide an apparatus and a method for providing job searching services, recruitment services, and/or recruitment-related services, which provides automatic notification of, and/or announcements of, job openings, position openings, projects, and/or assignments, the availability of job applicants and/or the availability of goods and/or service providers, to respective parties.

It is another object of the present invention to provide an apparatus and a method for providing job searching services, recruitment services, and/or recruitment-related services, which monitors, records, and/or provides notification of, any communications which take place and/or which may transpire between respective parties.

It is still another object of the present invention to provide an apparatus and a method for providing job searching services, recruitment services, and/or recruitment-related services, which provides for the generation of and/or the distribution of electronic catalogs and/or electronic coupons related to job search activities and/or recruitment activities.

It is yet another object of the present invention to provide an apparatus and a method for providing job searching services, recruitment services, and/or recruitment-related services, which provides notification of job-search-related and/or recruitment-related events and/or occurrences.

It is another object of the present invention to provide an apparatus and a method for providing job searching services, recruitment services, and/or recruitment-related services, which monitors, records and/or keeps track of, job search and/or recruitment activities of, and for, any of the respective parties.

It is still another object of the present invention to provide an apparatus and a method for providing job searching services, recruitment services, and/or recruitment-related services, which provides for the storage and/or the utilization of data and/or information with various and/or varying levels of confidentiality and/or specificity.

It is yet another object of the present invention to provide an apparatus and a method for providing job searching services, recruitment services, and/or recruitment-related services, which is utilized in conjunction with the buying, selling, bartering and/or trading, of goods and/or services.

It is another object of the present invention to provide an apparatus and a method for providing job searching services, recruitment services, and/or recruitment-related services, which provides enhanced confidentiality during the respective job search, recruitment, and/or related activities and/or interactions.

It is still another object of the present invention to provide an apparatus and a method for providing job searching services, recruitment services, and/or recruitment-related services, which monitors and/or records communications, interactions, and/or dealings, between parties.

It is yet another object of the present invention to provide an apparatus and a method for providing job searching services, recruitment services, and/or recruitment-related services, which provides statistical information pertaining to job searches, recruitment activities, and/or related activities.

It is another object of the present invention to provide an apparatus and a method for providing job searching services, recruitment services, and/or recruitment-related services, which can be utilized in conjunction with independent job search efforts and/or independent recruitment efforts.

It is still another object of the present invention to provide an apparatus and a method for providing job searching services, recruitment services, and/or recruitment-related services, which can administer a financial account for, and/or on behalf of a party, and which can effect a payment from one party to another, and/or receive a payment for, and/or on behalf of, a party.

It is yet another object of the present invention to provide an apparatus and a method for providing job searching services, recruitment services, and/or recruitment-related services, for schools, colleges, universities, and/or any organizations of any kind.

Other objects and advantages of the present invention will be apparent to those skilled in the art upon a review of the Description of the Preferred Embodiment taken in conjunction with the Drawings which follow.

DESCRIPTION OF THE PREFERRED EMBODIMENTS

Figure 1:
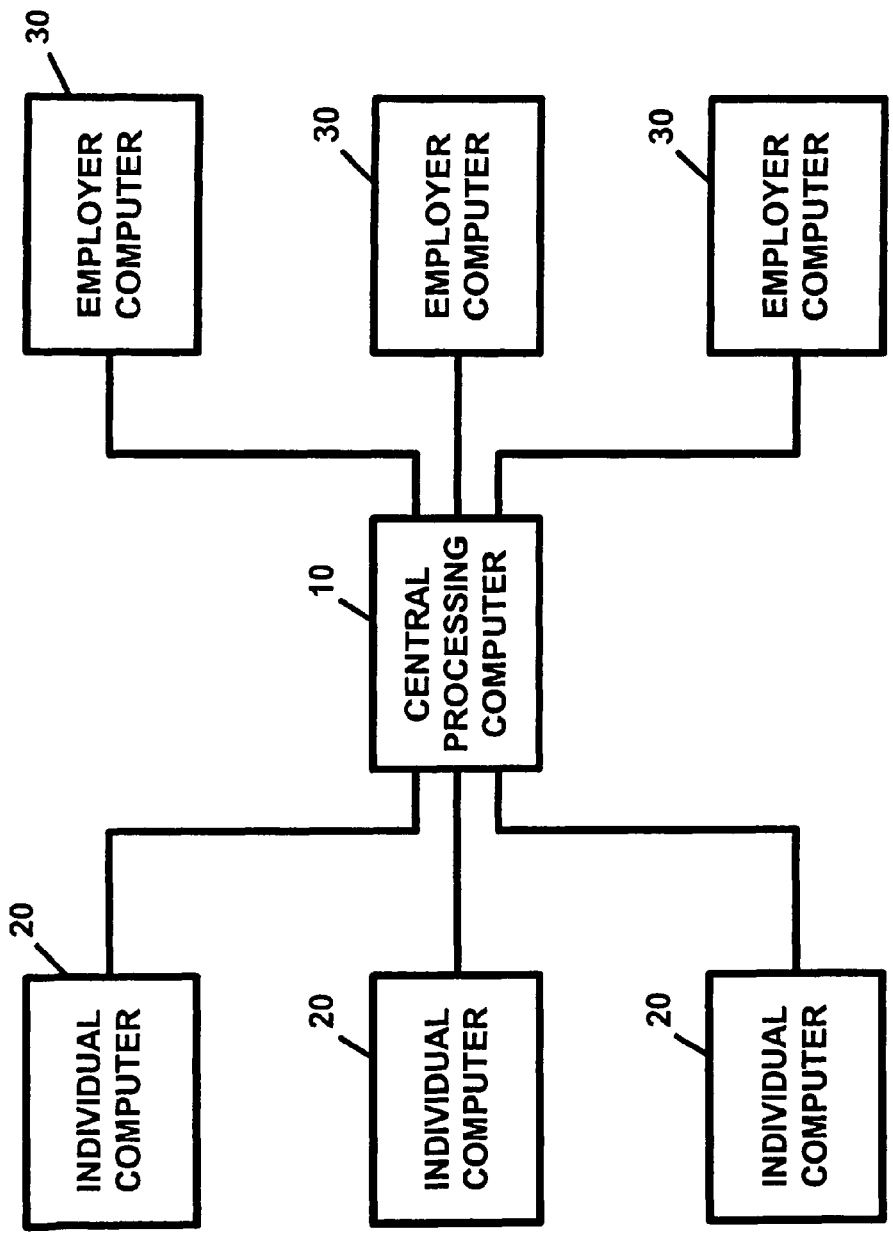
FIG. 1 illustrates the apparatus of the present invention, in block diagram form.

The present invention is directed to an apparatus and a method for providing job searching services, recruitment services, and/or recruitment-related services, and, in particular, to an apparatus and a method for providing job searching services, recruitment services, and/or recruitment-related services, for effectuating services and activities involving and/or related to job search efforts and/or recruitment efforts, by, and/or for, individuals, independent contractors, freelancers, employers and/or hiring entities.

The apparatus and method of the present invention provides services which facilitate individual, independent contractor, and/or freelancer, job search efforts, employer and/or hiring entity recruitment, search and/or placement efforts, and/or related efforts. The present invention also provides a centralized apparatus, and/or a clearinghouse, for providing and/or for facilitating the herein-described efforts, services, and/or activities.

The apparatus and method of the present invention can be utilized by individuals and entities desirous of identifying and/or securing an employment relationship, either permanent and/or temporary, an independent contractor relationship, and/or a freelancer relationship, with an employer and/or hiring entity. The apparatus and method of the present invention can also be utilized by employers and/or hiring entities desirous of searching for, and/or for securing the services of, an individual, an independent contractor, and/or a freelancer, either permanently and/or temporarily.

The present invention can also be utilized by an employment agency, an agent, a recruiter, a so-called "headhunter", a career consultant, a personal manager, and/or an intermediary, to assist an individual, an independent contractor, and/or a freelancer, in searching for a job, a position, a project, and/or assignment. The present invention can also be utilized to assist an employer and/or hiring entity to search for an individual, an independent contractor, and/or a freelancer. The present invention can also be utilized in order to provide agency services for any of the herein described parties, such as, but not limited to, individuals, independent contractors, freelancers, employers, hiring entities, recruiters, and/or headhunters.

The terms "individual", "employee", "prospective employee", "applicant", "contractor", "independent contractor", "temp", "temporary employee", "freelancer" etc., as used herein, refer to any individual, person, company, business entity, independent contracting business or entity, employment agent and/or agency, and/or any other entity, seeking to identify, find, and/or secure, a job, an employment position, a project, and/or an assignment, for himself, herself, itself, and/or for another.

The terms "employer", "hiring entity", "company", "business", etc., as used herein, refer to any employer, hiring entity, individual, person, company, business entity, and/or other entity, seeking to identify, find, or secure the services of, an individual, independent contractor, and/or freelancer, for itself and/or for another.

The terms "recruiter", "headhunter", "employment agency", "placement agency", "employment consultant", "placement consultant", etc., refer to any individual, person, and/or entity, who or which acts as an intermediary for, and/or on behalf of, any party or parties described herein, in order to initiate and/or to effectuate a job search and/or a recruitment activity and/or any searches or activities which result, and/or which proceed, therefrom.

Applicant hereby incorporates by reference herein the subject matter and teachings of U.S. Provisional Patent Application Ser. No. 60/146,776 which teaches an apparatus and method for providing job searching services, recruitment services and/or recruitment-related services, the subject matter and teachings of which are hereby incorporated by reference herein in their entirety.

Applicant hereby incorporates by reference herein the subject matter and teachings of U.S. patent application Ser. No. 12/315,124, filed Nov. 29, 2008, and entitled "APPARATUS AND METHOD FOR PROVIDING JOB SEARCHING SERVICES, RECRUITMENT SERVICES AND/OR RECRUITMENT-RELATED SERVICES", the subject matter and teachings of which are hereby incorporated by reference herein in their entirety.

The apparatus and method of the present invention can be utilized in a network environment in order to effectuate any of the services described herein.

FIG. 1 illustrates a preferred embodiment of the apparatus of the present invention which is designated generally by the reference numeral 100. In FIG. 1, the apparatus 100 includes a central processing computer or server computer 10. The central processing computer 10 provides control over the apparatus 100 and provides services for the various computers associated with the various individuals employees, contractors, independent contractors, freelancers, employers, hiring entities, recruiters, etc., who or which utilize the apparatus 100 of the present invention.

The central processing computer 10, in the preferred embodiment, can be any suitable computer, network computer, or computer system, for providing service for the various computers associated with the individuals, employees, independent contractors, freelancers, employers, hiring entities, recruiters, etc., who or which utilize the present invention.

In the preferred embodiment, any number of central processing computers 10 may be utilized in order to provide the servicing functions described herein. The central processing computer(s) 10 may be linked to other central processing computers or may be stand alone devices. A given central processing computer 10 may service a particular geographic area or certain individuals employees, independent contractors, freelancers, employers, hiring entities, recruiters, etc., and/or groups thereof. A central processing computer 10 may also be dedicated to service any one or group of the above described individuals and/or entities.

The apparatus 100, in the preferred embodiment, also includes one or more individual computers 20. Each individual computer 20 may be a personal computer or other communication device suitable for allowing the individual to interact with the central processing computer(s) 10. Each individual computer 20 can be utilized to transmit information to the central processing computer 10 and to receive information from the central processing computer 10 via the communication network.

The individual computer 20 can be a personal computer, a hand-held computer, a palmtop computer, a laptop computer, a personal communication device, a personal digital assistant, a telephone, a digital telephone, a display telephone, a video telephone, a videophone, a 3G telephone, a television, an interactive television, a beeper, a pager, and/or a watch. In the present invention, any number of individual computers 20 may be utilized. In the present invention, each individual or entity utilizing the present invention may have one or more individual computers 20 associated therewith.

The apparatus 100, in the preferred embodiment, also includes one or more employer computers 30. Each employer computer 30 may be a personal computer or other communication device suitable for allowing the employer to interact with the central processing computer(s) 10. Each employer computer 30 can be utilized to transmit information to the central processing computer 10 and to receive information from the central processing computer 10 via the communication network.

The employer computer 30 can be a personal computer, a hand-held computer, a palmtop computer, a laptop computer, a personal communication device, a personal digital assistant, a telephone, a digital telephone, a display telephone, a video telephone, a videophone, a 3G telephone, a television, an interactive television, a beeper, a pager, and/or a watch. In the preferred embodiment, any number of employer computers 30 may be utilized. In the present invention, each employer and/or hiring entity utilizing the present invention may have one or more employer computers 30 associated therewith.

Each of the individual computer(s) 20 and each of the employer computer(s) 30 described herein can transmit information to each central processing computer 10 as well as receive information from each central processing computer 10. In addition, each individual computer 20 can also transmit information to any employer computer 30 as well as receive information from any employer computer 30. In a similar manner, each employer computer 30 can transmit information to any individual computer 20 as well as receive information from any individual computer 20.

The central processing computer(s) 10, the individual computer(s) 20, and/or the employer computer(s) 30 can communicate with one another, and/or be linked to one another, over a communication network and/or a wireless communication network. In the preferred embodiment, the present invention is utilized on, and/or over, the Internet and/or the World Wide Web. The present invention, in the preferred embodiment, can also utilize wireless Internet and/or World Wide Web services, equipment and/or devices. The central processing computer(s) 10, in the preferred embodiment, has a web site or web sites associated therewith.

Although the Internet and/or the World Wide Web is the preferred communication system and/or medium utilized, the present invention, in all of the embodiments described herein, can also be utilized with any appropriate communication systems including, but not limited to, network communication systems, telephone communication systems, cellular communication systems, digital communication systems, personal communication systems, personal communication services (PCS) systems, satellite communication systems, broad band communication systems, low earth orbiting (LEO) satellite systems, and/or public switched telephone networks or systems.

In the preferred embodiment, each of the central processing computer(s) 10, the individual computer(s) 20, and employer computer(s) 30, can transmit data and/or information using TCP/IP, as well as any other Internet and/or World Wide Web, protocols.

The individual computer 20, in the preferred embodiment, can be linked directly or indirectly with a central processing computer 10. The employer computer 30, in the preferred embodiment, can also be linked directly or indirectly with a central processing computer 20. In any of the preferred embodiments described herein, any individual computer(s) 20 and any employer computer(s) 30 can be linked directly or indirectly with one another so as to facilitate a direct or indirect bi-directional communication between an individual computer(s) 20 and an employer computer(s) 30.

Figure 2:
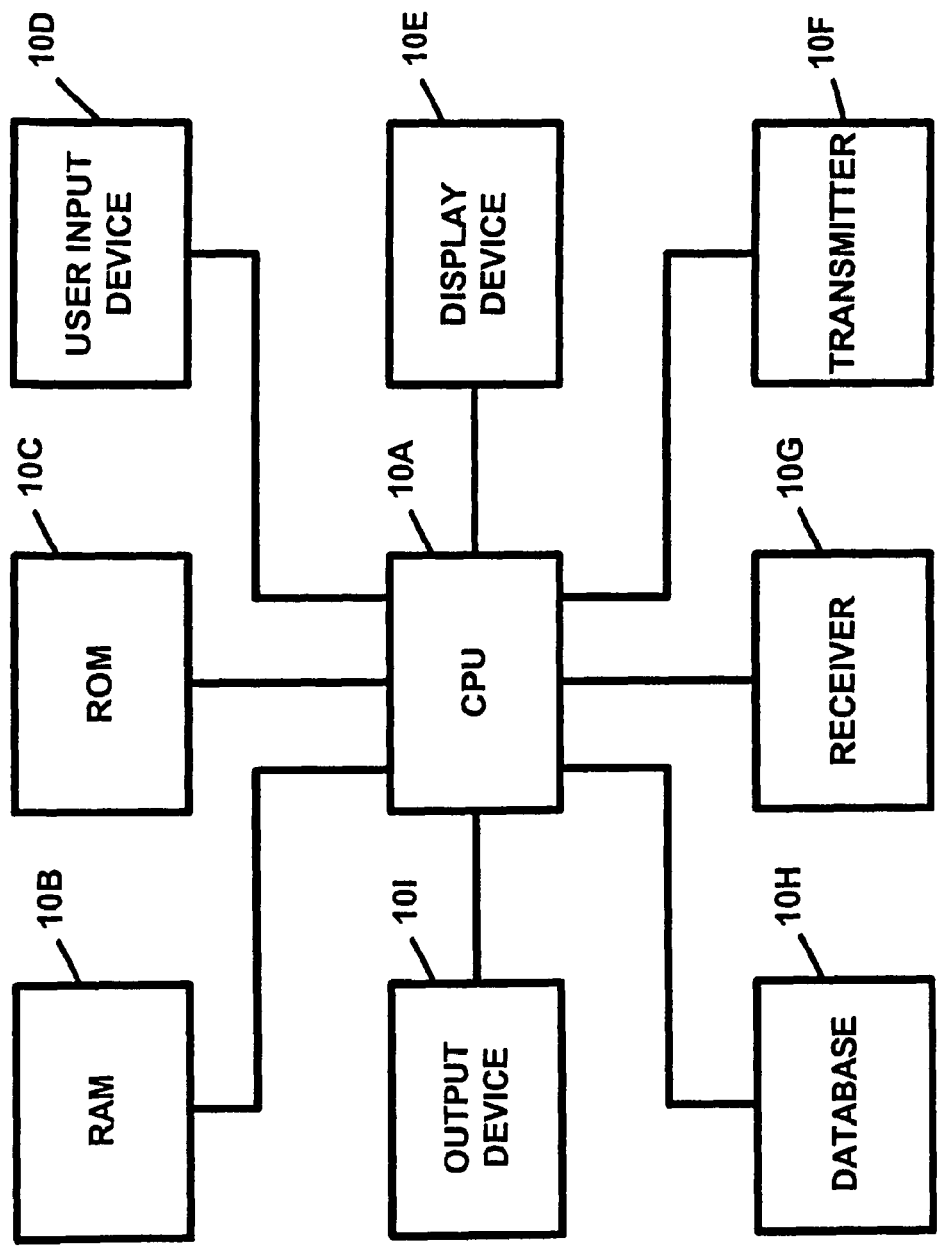
FIG. 2 illustrates the central processing computer of the apparatus of FIG. 1, in block diagram form.

FIG. 2 illustrates the central processing computer 10, in block diagram form. The central processing computer 10, in the preferred embodiment, is a network computer or computer system which is utilized as a central processing computer such as an Internet server computer and/or a web site server computer. In the preferred embodiment, the central processing computer 10 includes a central processing unit or CPU 10A, which in the preferred embodiment, is a microprocessor. The CPU 10A may also be a microcomputer, a minicomputer, a macro-computer, and/or a mainframe computer, depending upon the application.

The central processing computer 10 also includes a random access memory device(s) 10B (RAM) and a read only memory device(s) 10C (ROM), each of which is connected to the CPU 10A, a user input device 10D, for entering data and/or commands into the central processing computer 10, which includes any one or more of a keyboard, a scanner, a user pointing device, such as, for example, a mouse, a touch pad, and/or an audio input device and/or a video input device, etc., if desired, which input device(s) are also connected to the CPU 10A. The central processing computer 10 also includes a display device 10E for displaying data and/or information to a user or operator.

The central processing computer 10 also includes a transmitter(s) 10F, for transmitting signals and/or data and/or information to any one or more of the individual computer(s) 20 and employer computer(s) 30 which may be utilized in conjunction with the present invention. The central processing computer 10 also includes a receiver 10G, for receiving signals and/or data and/or information from any one or more of the individual computer(s) 20 and/or employer computer(s) 30.

The central processing computer 10 also includes a database(s) 10H which contains data and/or information pertaining to the individuals, employees, independent contractors, freelancers, and/or other persons or entities, who or which utilize the present invention in order to find or secure a job, project, or assignment. The database 10H also contains data and/or information pertaining to the employers and/or hiring entities who or which utilize the present invention to recruit individuals, independent contractors, or freelancers, in order to satisfy their needs and/or requirements. The database 10H may also contain data and/or information pertaining to recruiters, headhunters, management consultants, managers, and/or other intermediaries, and/or third parties, who or which utilize the present invention in order to act on behalf of any of the individuals, independent contractors, freelancers, employers and/or hiring entities, who attempt to match the needs of any of the parties described herein.

Individual data and/or information, which can be stored in the database 10H, can include, but not be limited to, the individual's name, sex, age, address, educational information, schooling, work experience, work history, skills, work-related skills, past employers, references, salary history, salary requirements, benefit requirements, school transcripts, links to registrar's offices and/or databases at respective school(s) and/or to a transcript database and/or electronic storage facility, medium, and/or device, which stores transcripts and/or other scholastic and/or educational information about an individual(s), work samples, reference letters, recommendation letters, pictures, video clips, and/or other relevant and/or pertinent information. In this manner, the present invention facilitates more efficient access to data and/or information pertaining to an individual(s).

In order to preserve confidentiality and/or so as to maintain an anonymous identity, each of the above-described types of information can be described in a generic manner, i.e., a school can be listed as a large Ivy League institution as opposed to being named and positively identified. For example, an individual can be described as being a mid-level engineer having experience in computer programming, etc.

Each and every field of data and/or information can be represented by a corresponding generic term or terms so as to keep the true information masked for a desired time period or during a certain period of processing. The individual data and/or information can also include certain jobs and/or events and/or occurrences for which the individual may desire to be notified. Any of the data and/or information may have hyperlinks associated therewith for directing a party to a separate and/or a different data and/or information source. The information source may be external from the central processing computer 10.

The database 10H can also contain data and/or information restricting access to any of the data and/or information stored in the database 10H. For example, an individual, independent contractor, freelancer, employer, and/or hiring entity, may, at any time, may restrict access by any party, to any of their respective data and/or information. For example, an individual may prevent a current employer from accessing his or her data and/or information, thereby maintaining the confidentiality of a job search. Similarly, any party may restrict the availability of any of its data and/or information from any other party or parties.

In the cases of temporary employees, self-employed individuals, professionals, independent contractors, freelancers, etc., the database 10H can contain information regarding the schedules and/or work calendars for any of these individuals, employees, and/or entities. In this regard, each individual, employee, and/or entity in this category may store and have maintained by the apparatus 100, a work schedule and/or working calendar which can provide information regarding days and/or time periods of employment and/or engagement as well as days and/or time periods of availability.

The database 10H can also contain information pertaining to employers whom an individual will readily work for if the employer should need and/or request the individual. The individual data and/or information can also include employers and/or hiring entities whom the individual, independent contractor, or freelancer, has agreed in advance to work for, as well as employers and/or hiring entities whom the individual has decided in advance not to work for. The database 10H can also include information regarding which employers and/or hiring entities may access an individual's data and/or information as well as those employers and/or hiring entities who may not access an individual's data and/or information.

The database 10H also includes data and/or information about employers who or which utilize the present invention which information includes, but is not limited to, employer name, company name, job offerings, job openings, job(s) or position(s) needed to be filled, job(s) or position(s) desired to be filled, employer size, employer location, regional location, jobs or positions employed, benefits offered, employer history, salary information, compensation information, customer information, supplier information, information from past employees, information from current employees, past and/or current employment agencies or recruiter representing the employer, types of positions, including but not limited to permanent and/or temporary positions, references, pictures of facilities, video clips, fringe benefits, work hours, work requirements, recommendation letters, salary and/or compensation information.

The data and/or information contained in the database 10H can also include information concerning events, occurrences, availability of an applicant or applicants and/or any other information of which the employer may which to be notified.

As in the case with individuals, in order to preserve confidentiality and/or so as to maintain an anonymous identity, each of the above-described types of information can be described in a generic manner, i.e., an employer can be listed as a large computer manufacturer as opposed to being named and positively identified.

Each and every field of data and/or information, described herein as being stored in the database 10H and/or otherwise utilized by the present invention, can be represented by a corresponding generic term or terms so as to keep the true information masked for a desired time period or during a certain period of processing. The employer data and/or information can also include events and/or occurrences for which the employer may desire to be notified. Any of the data and/or information stored in the database 10H may have hyperlinks associated therewith for directing a party to a separate and/or to a different data and/or information source, which may also be external form the central processing computer 10.

The employer data and/or information can also include work schedules and/or work calendars which provide information regarding when the employer will be in need of the assistance of and/or the services of individuals, independent contractors, temporary employees, and/or freelancers. The database 10H can contain information regarding the schedules and/or work calendars providing notification of the human resource and/or employee requirements for the employer and/or hiring entity thereby providing information regarding days and/or time periods when it will require the assistance of individuals, independent contractors and/or freelancers.

The database 10H may also contain information regarding which individuals, independent contractors, and/or freelancers, may be approved, in advance, for hiring and/or for working for the employer and/or hiring entity, as well as data and/or information regarding which individuals, independent contractors, and/or freelancers, may be prohibited, in advance, from being hired by, and/or from working for, the employer and/or hiring entity. The database 10H may also contain information regarding which individuals, independent contractors, and/or freelancers, may obtain information about the employer and/or hiring entity as well as information regarding those individuals who may be prohibited from obtaining such information. The database 10H may also contain information regarding which individuals, independent contractors, and/or freelancers, may apply for a job, position, project, or assignment, with an employer and/or hiring entity as well as information regarding those individuals who may be prohibited from so applying.

The database 10H may also contain data and/or information pertaining to an employment agency, recruiters, headhunters, agents, managers, and/or other third party intermediaries (hereinafter "recruiter"), who or which attempt to brings individuals and employers together so as to facilitate the fulfillment of the needs of the respective parties. The information can include, but not be limited to, the recruiter's name, location, types of positions filled by same, information from past clients, references, past dealings and/or deals with an employer and/or hiring entity, salary histories of past deals, etc.

As in the case with individuals and employers, in order to preserve confidentiality and/or so as to maintain an anonymous identity, each of the above-described types of information can be described in a generic manner, i.e., a recruiter and/or any information pertaining thereto can be described generically, i.e. a legal recruiter specializing in placing bankruptcy attorneys, etc., as opposed to being named and positively identified.

Each and every field of data and/or information can be represented by a corresponding generic term or terms so as to keep the true information masked for a desired time period or during a certain period of processing. The recruiter data and/or information can also include events and/or occurrences for which the recruiter may desire to be notified. Any of the data and/or information stored in the database 10H may have hyperlinks associated therewith for directing a party to a separate and/or a different data and/or information source, which may also be external from the central processing computer 10.

The database 10H may also contain any other information which may be relevant, pertinent, useful, and/or desired, for facilitating the operation of the apparatus and method of the present invention as described herein and/or as related thereto.

The database 10H, in the preferred embodiment, is a database which may include individual databases or collections of databases, with each database being designated to store any and all of the data and/or information described herein.

The database 10H may also contain data and/or information concerning past placements and/or transactions with such data and/or information being stored after each placement and/or transaction which occurs via the apparatus and method of the present invention. Any and all data and/or information can be stored regarding transactions which occur via the present invention as well as those transactions which occur independently of the present invention. The data and/or information can then be compiled and processed using statistical calculations in order to update the stored historical placement and/or transaction data and/or information with such data and/or information being made available to users of the apparatus 100. Applicant hereby incorporates by reference herein the teachings of *Basic Business Statistics Concepts and Applications*, Mark L. Berenson and David M. Levine, $6^{th}$ Edition, Prentice Hall 1996.

The database 10H may also contain data and/or information concerning attrition rates at individual employers and/or hiring entities, as well as in different fields and/or market sectors, salary information, salary surveys for particular jobs, professions, etc., including salary, benefits, and/or other compensation, data and/or information for various experience levels, skill levels, skills and abilities, educational credentials, and/or other data and/or information which may be utilized by any of the individuals and/or employers described herein, by job or profession type, by market sector, by type of employer, and/or by location and/or geographic region.

The database 10H may also contain data and/or information regarding the latest developments and/or current developments in the employment and/or recruiting field, including, but not limited to, growth areas, demand information for certain jobs and/or professions, etc.

The data and/or information which is stored in the database 10H, or in the collection of databases, can be linked via relational database techniques, to the respective employer computers 30 and/or individual computers 20 and/or via any appropriate database management techniques. The data and/or information, in the preferred embodiment, can be updated via inputs from the respective individual computers 20, and/or employer computers 30, and/or from any other information source, at any time. Information updates can also be provided from other information sources via the communication network.

The database 10H, or collection of databases, may be updated by each of the respective individuals, employers, or by an administrator and/or operator of the central processing computer 10, and/or by any other third party, in real-time, and/or via dynamically linked database management techniques. The data and/or information stored in the database 10H can also be updated by external sources. The database 10H will contain any and all information deemed necessary and/or desirable for providing all of the processing and/or services and/or functions described herein. Applicant hereby incorporates by reference herein the subject matter of *Fundamentals of Database Systems*, by Ramez Elmasri and Shamkant B. Navathe, $2^{nd}$ Ed., Addison-Wesley Publishing Company, 1994.

The database 10H can also contain any information needed for corresponding with any of the individuals, independent contractors, freelancers, employers and/or hiring entities, and/or recruiters, described herein, such as their respective addresses, telephone numbers, e-mail addresses, pager number, and/or any other information for facilitating a communication with any of these respective parties.

The database 10H can also include employer-related data and/or information, job and/or position-related information, individual, independent contractor and/or freelancer, data and/or information, recruiter, headhunter, and/or third party intermediary-related information, and/or any other data and/or information needed and/or desired for performing any of the herein-described methods and features of the present invention.

With reference once again to FIG. 2, the central processing computer 10 also includes an output device 101 such as a printer, a modem, a fax/modem, or other output device, for providing data and/or information to the operator or user of the central processing computer 10 or to a third party or third party entity.

In the preferred embodiment, each of the individual computer(s) 20 and the employer computer(s) 30, include the same, similar, or analogous, components and/or peripheral devices as described herein for the central processing computer 10. In this manner, any individual computer(s) 20 or employer computer(s) 30, may be the same as, or be similar to, the central processing computer 10. In this regard, and depending upon the application and/or individual and/or employer requirements, each of the individual computer(s) 20 and/or each of the employer computer(s) 30 can have the same or similar components as the central processing computer 10.

Figure 3:
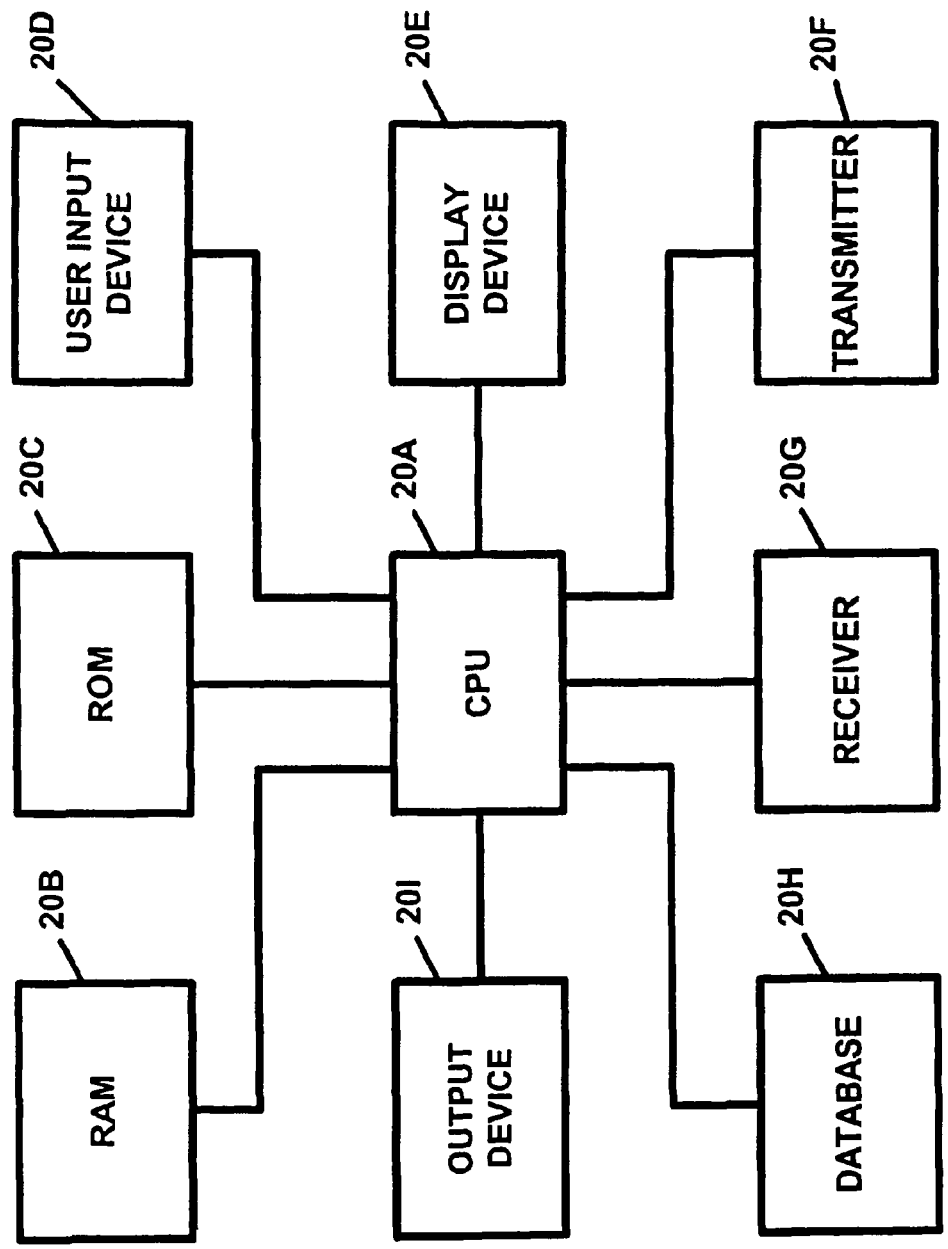
FIG. 3 illustrates the individual computer of the apparatus of FIG. 1, in block diagram form.

FIG. 3 illustrates the individual computer 20, in block diagram form. The individual computer 20, in the preferred embodiment, is a network computer or computer system which is utilized to access and/or to communicate with the central processing computer 10. In the preferred embodiment, the individual computer 20 includes a central processing unit or CPU 20A, which in the preferred embodiment, is a microprocessor. The CPU 20A may also be a microcomputer, a minicomputer, a macro-computer, and/or a mainframe computer, depending upon the application.

The individual computer 20 also includes a random access memory device(s) 20B (RAM) and a read only memory device(s) 20C (ROM), each of which is connected to the CPU 20A, a user input device 20D, for entering data and/or commands into the individual computer 20, which includes any one or more of a keyboard, a scanner, a user pointing device, such as, for example, a mouse, a touch pad, and/or an audio input device and/or a video input device, etc., if desired, which input device(s) are also connected to the CPU 20A. The individual computer 20 also includes a display device 20E for displaying data and/or information to a user or operator.

The individual computer 20 also includes a transmitter(s) 20F, for transmitting signals and/or data and/or information to any one or more of the central processing computer(s) 10 and to the employer computer(s) 30. The individual computer 20 also includes a receiver 20G, for receiving signals and/or data and/or information from any one or more of the central processing computer(s) 10 and/or the employer computer(s) 30.

The individual computer 20 also includes a database(s) 20H which can contain any and/or all of the data and/or information described herein with regards to the database 10H of the central processing computer 10. The database 20H can also contain data and/or information personal to an individual or group of individuals, as well as data and/or information concerning the work schedule(s) and/or work calendar(s) for the individual and/or group of individuals for which the individual computer(s) 20 is/are associated. This data and/or information can also include information concerning when the individual is scheduled to work and/or when the individual is available to take work assignments.

With reference once again to FIG. 3, the individual computer 20 also includes an output device 20I such as a printer, a modem, a fax/modem, or other output device, for providing data and/or information to the operator or user of the individual computer 20 or to a third party or third party entity.

Figure 4:
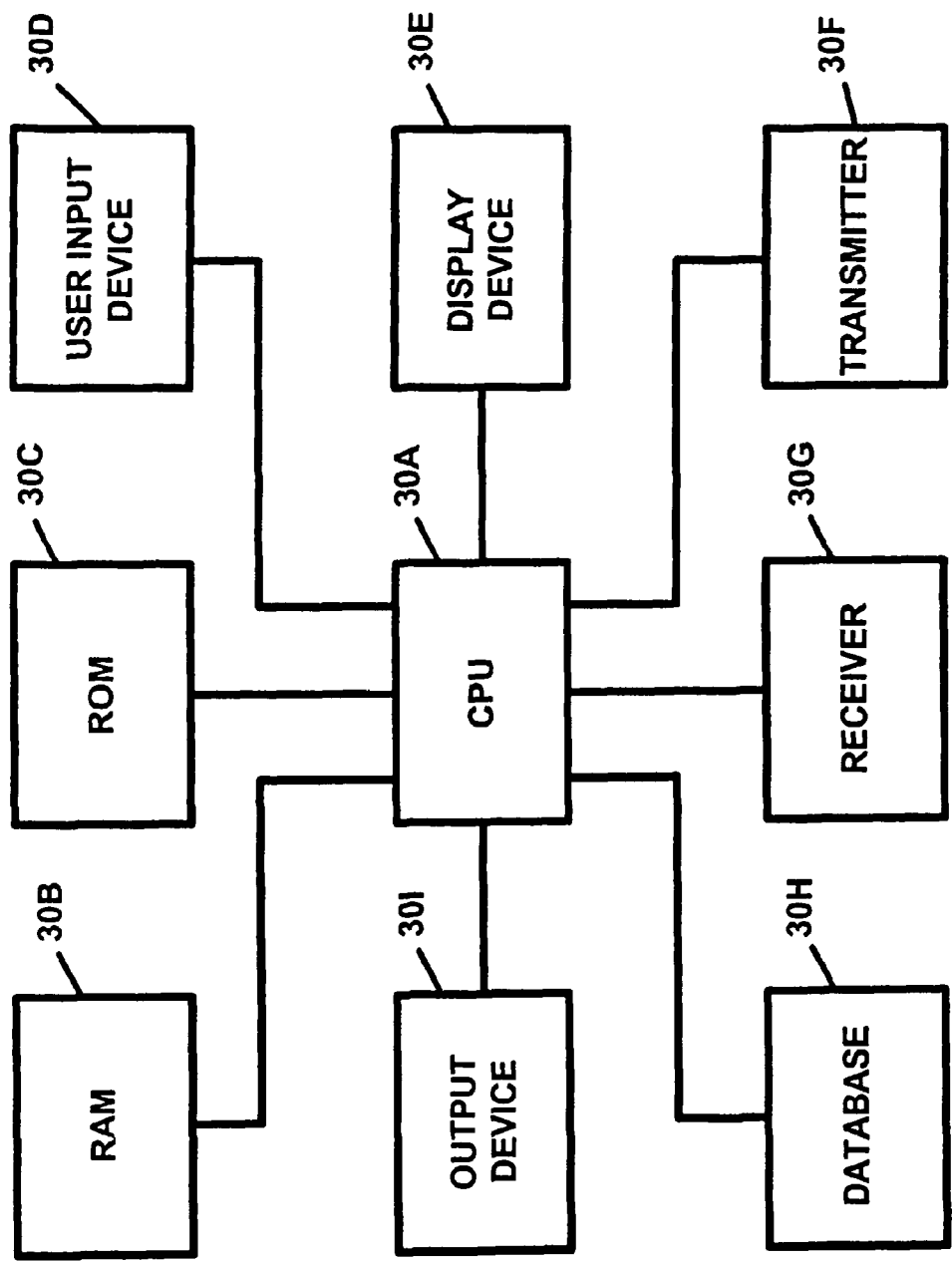
FIG. 4 illustrates the employer computer of the apparatus of FIG. 1, in block diagram form.
Figure 5A:
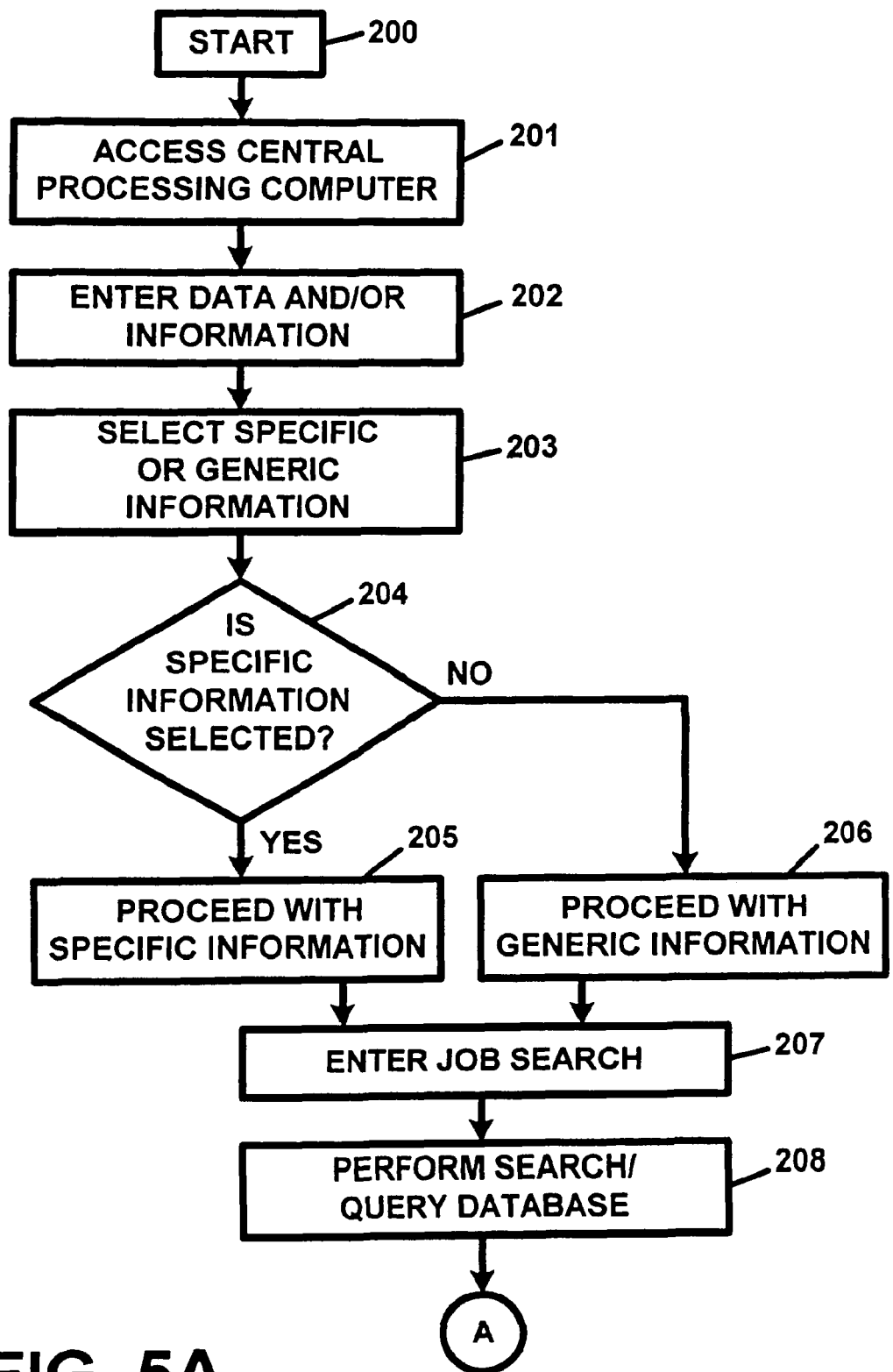
FIGS. 5A to 5E illustrate a preferred embodiment operation of the apparatus of FIG. 1, in flow diagram form.
Figure 5B:
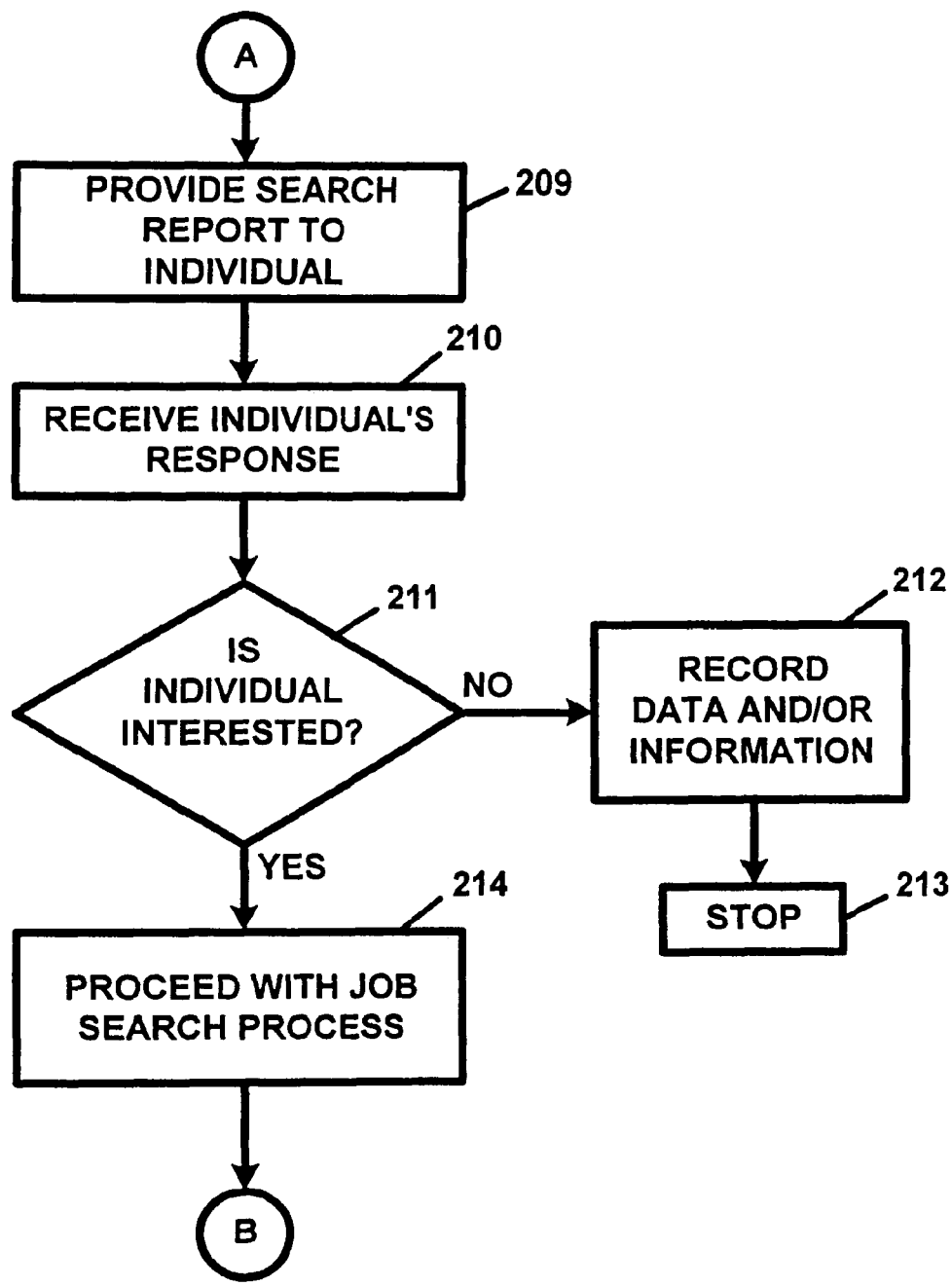
Figure 5C:
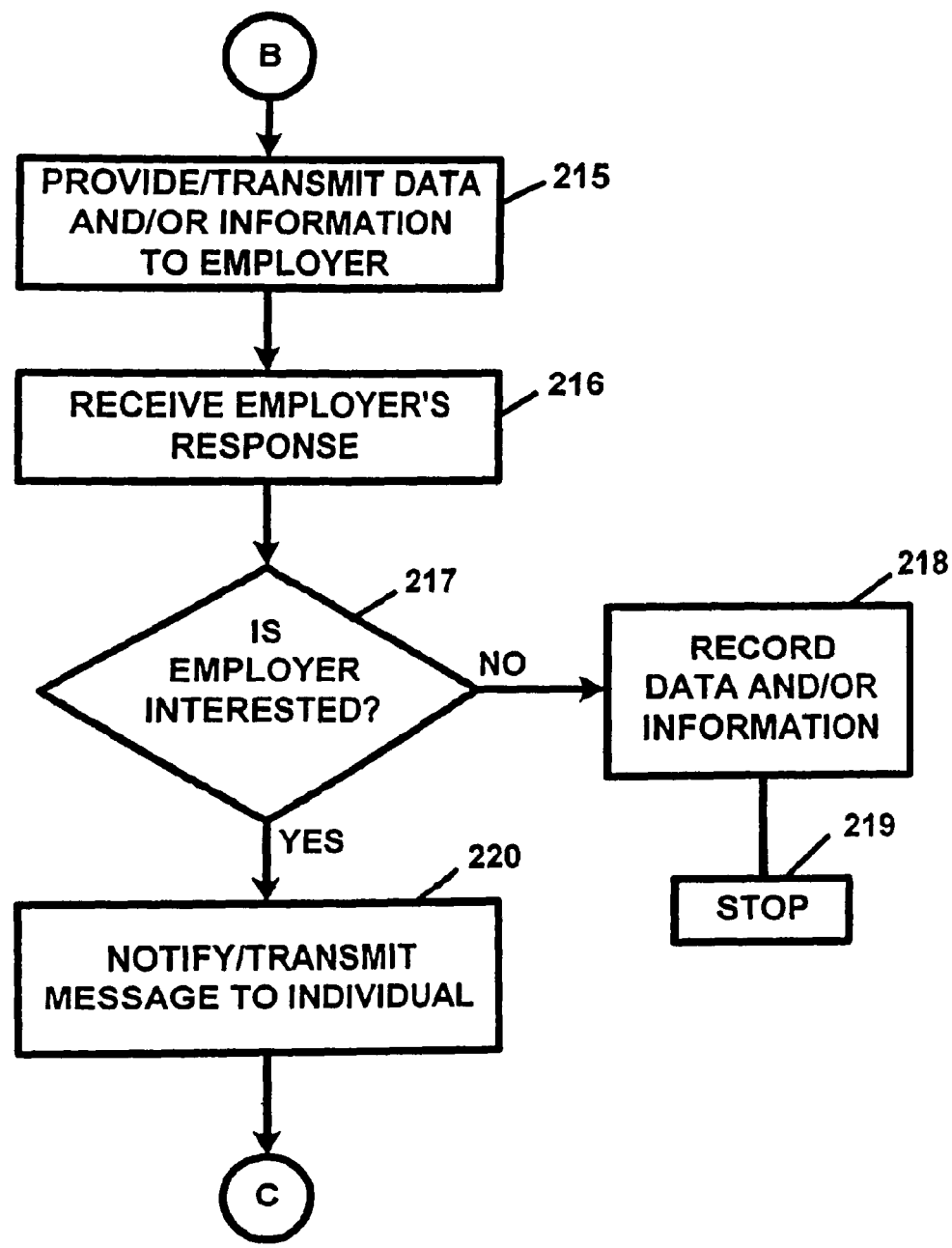
Figure 5D:
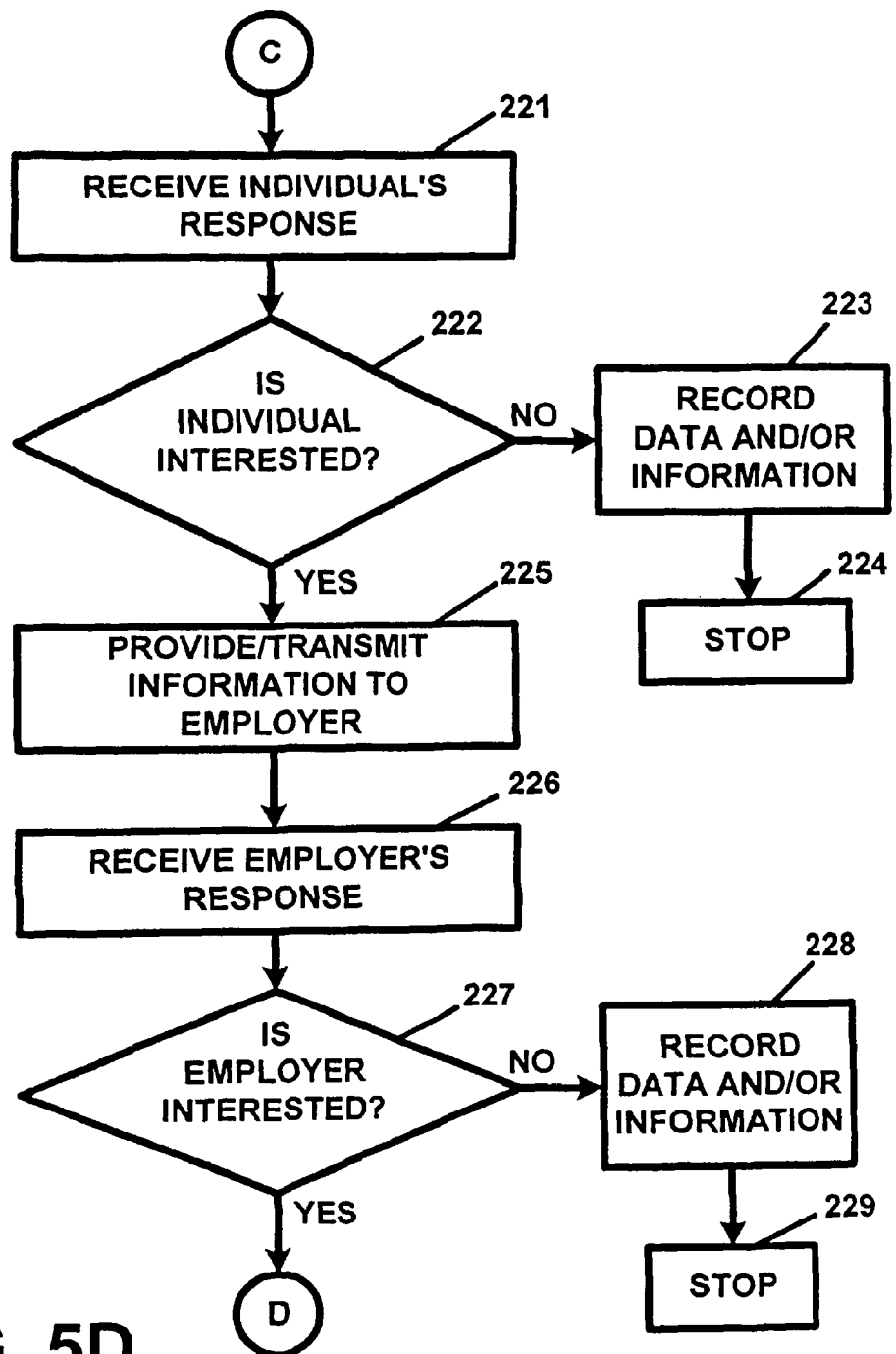
Figure 5E:
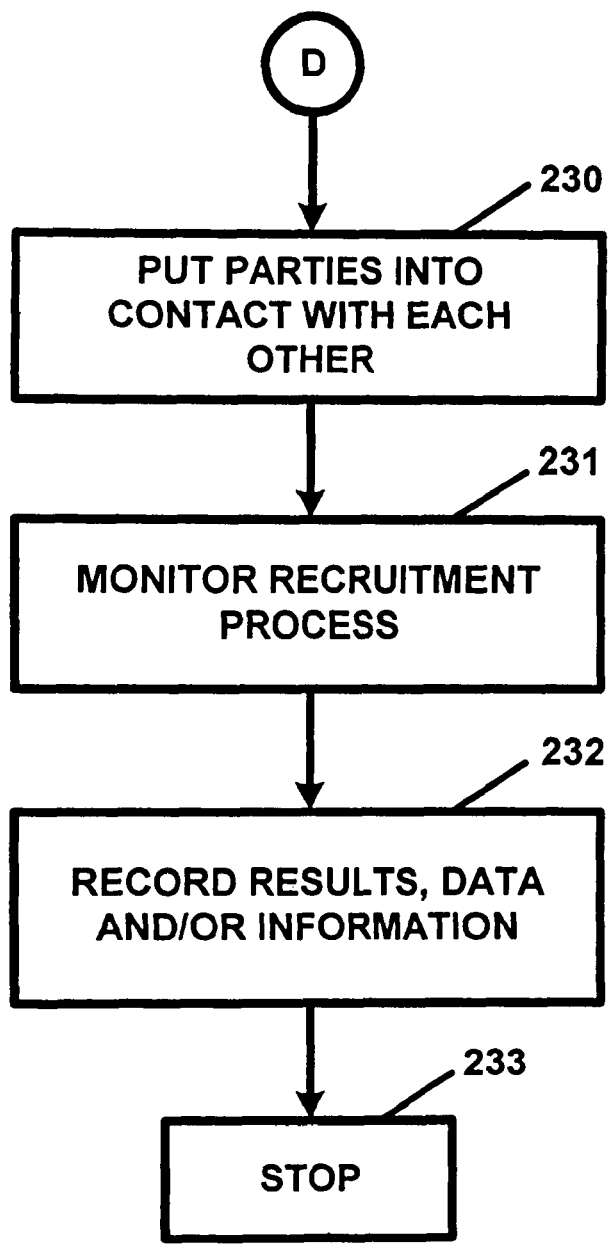
Figure 6A:
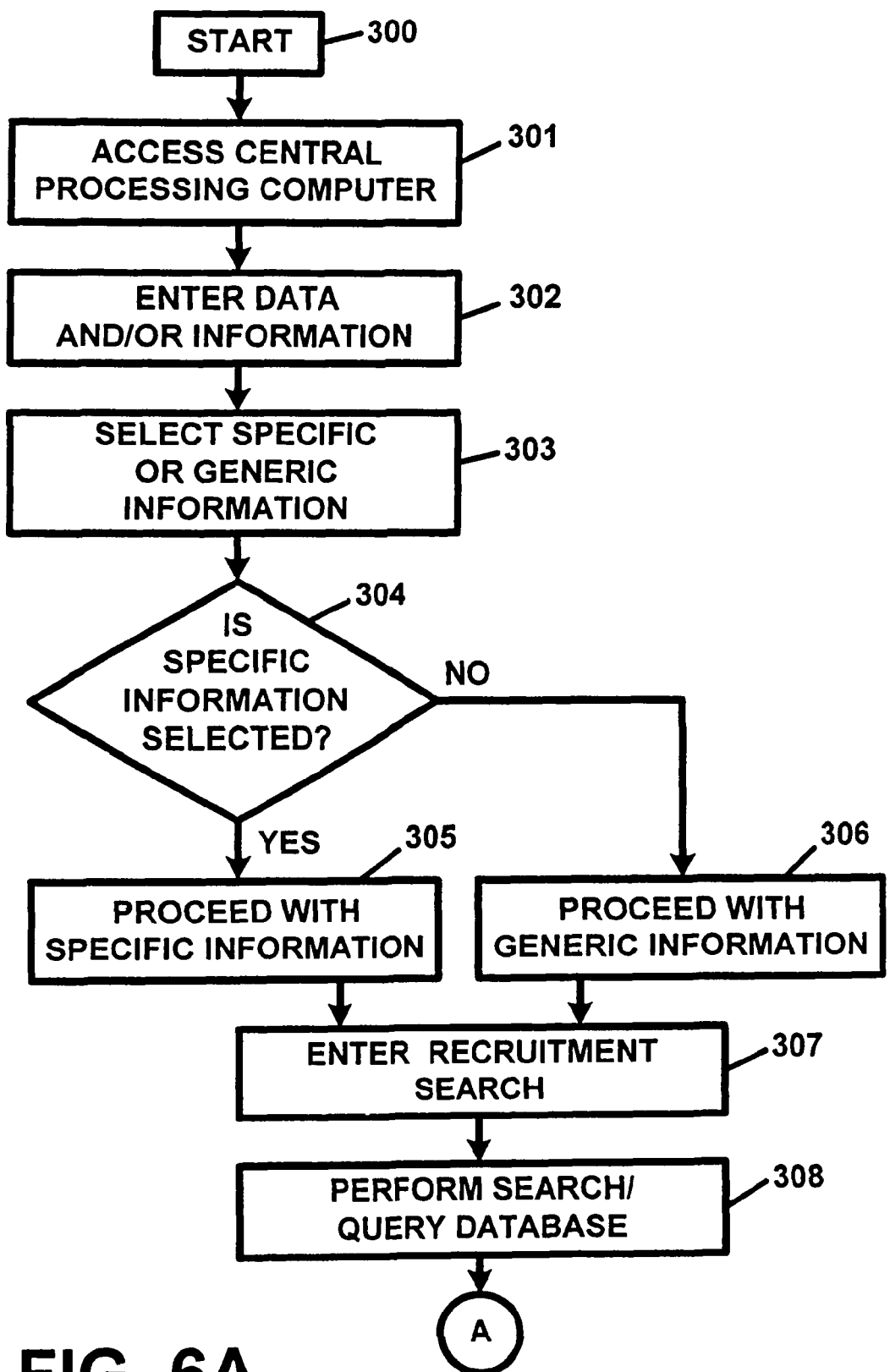
FIGS. 6A to 6E illustrate another preferred embodiment operation of the apparatus of FIG. 1, in flow diagram form.
Figure 6B:
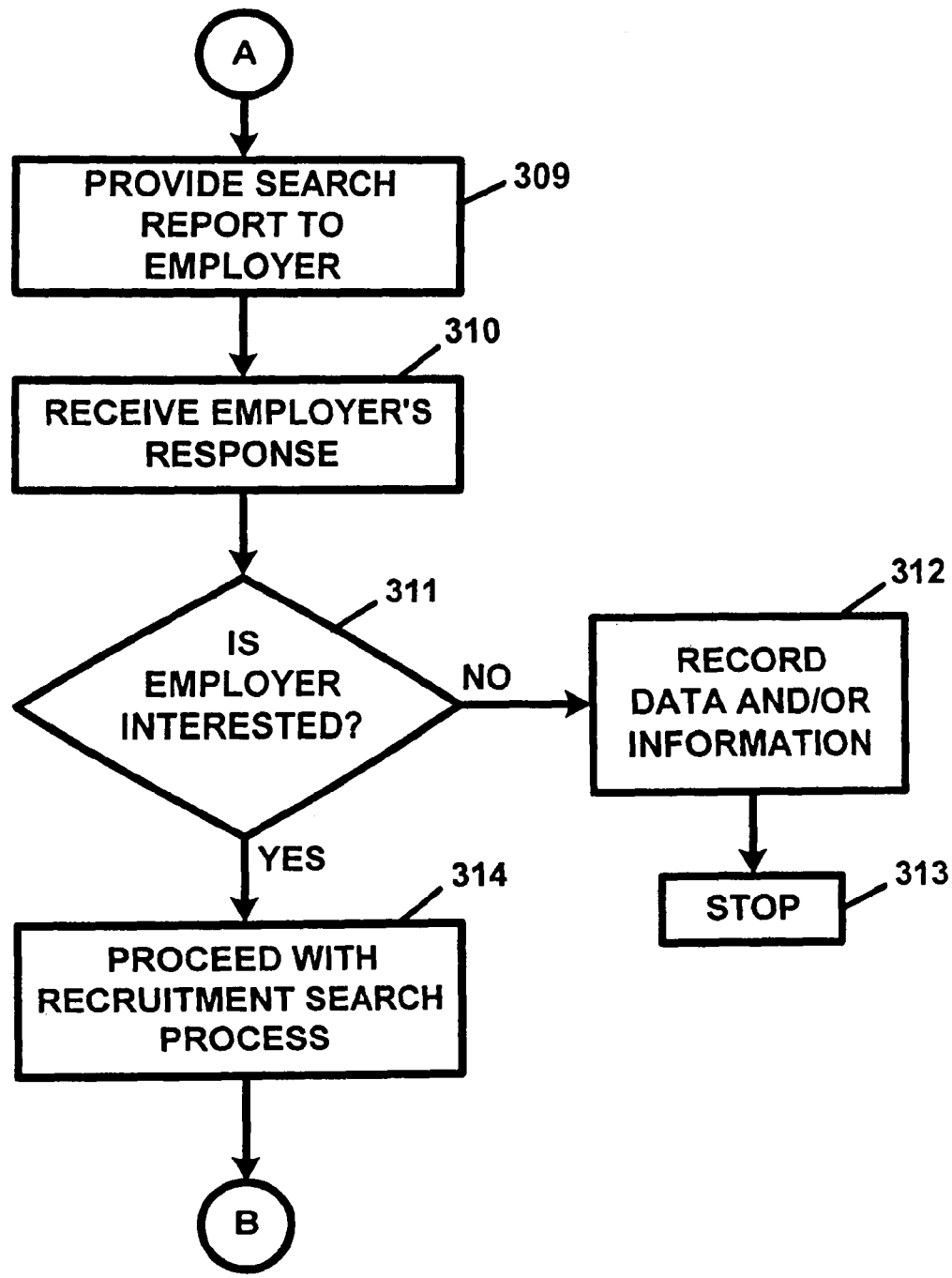
Figure 6C:
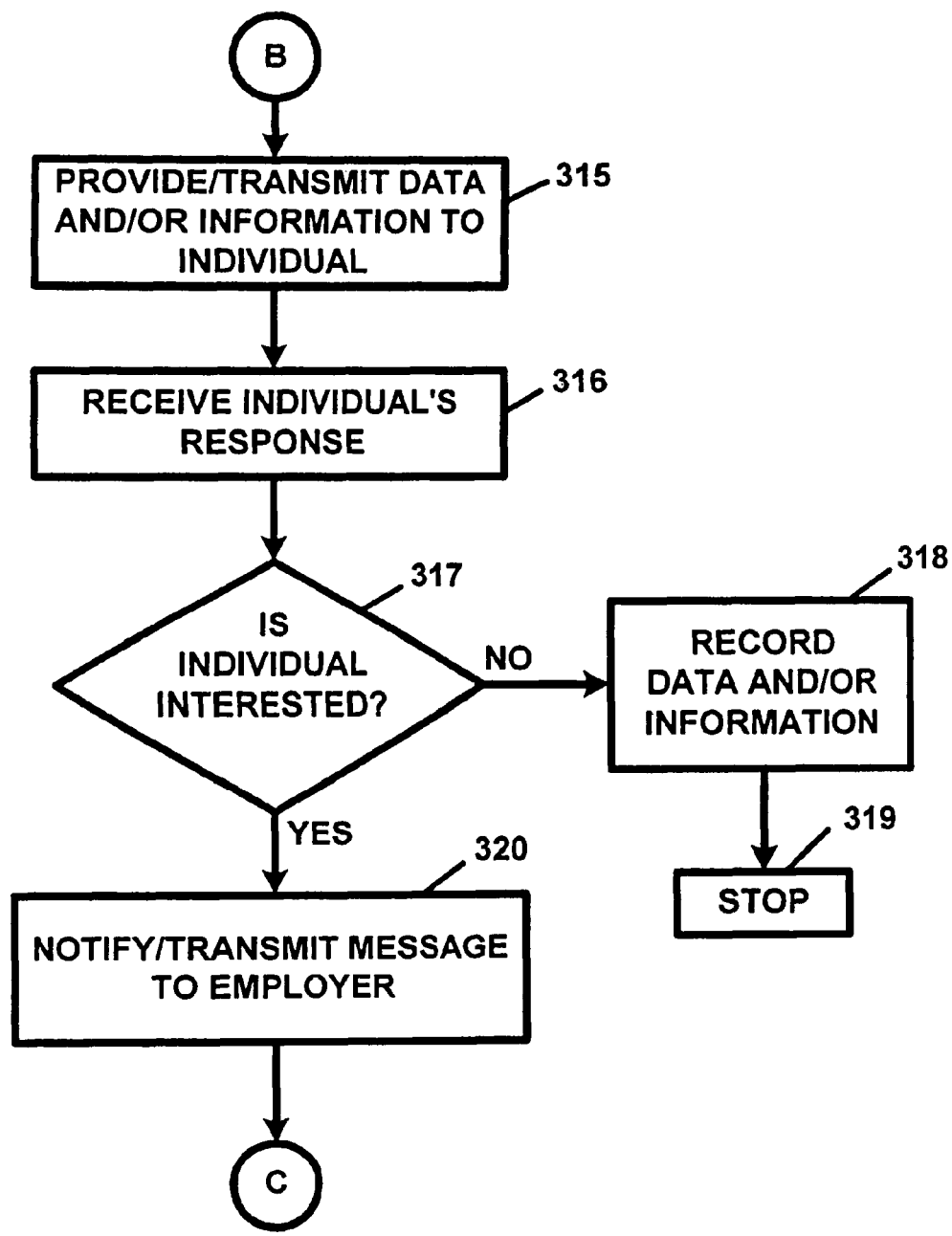
Figure 6D:
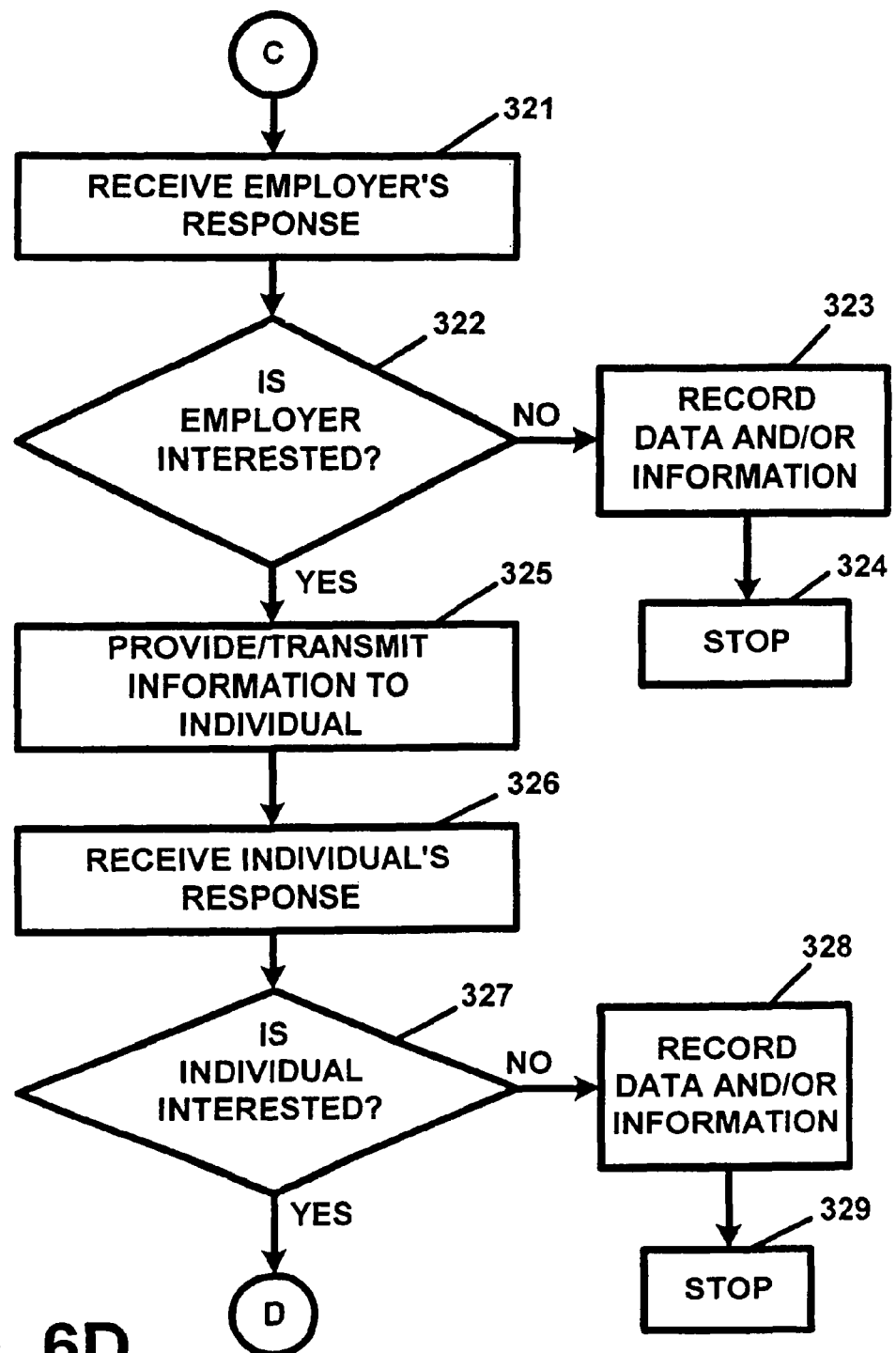
Figure 6E:
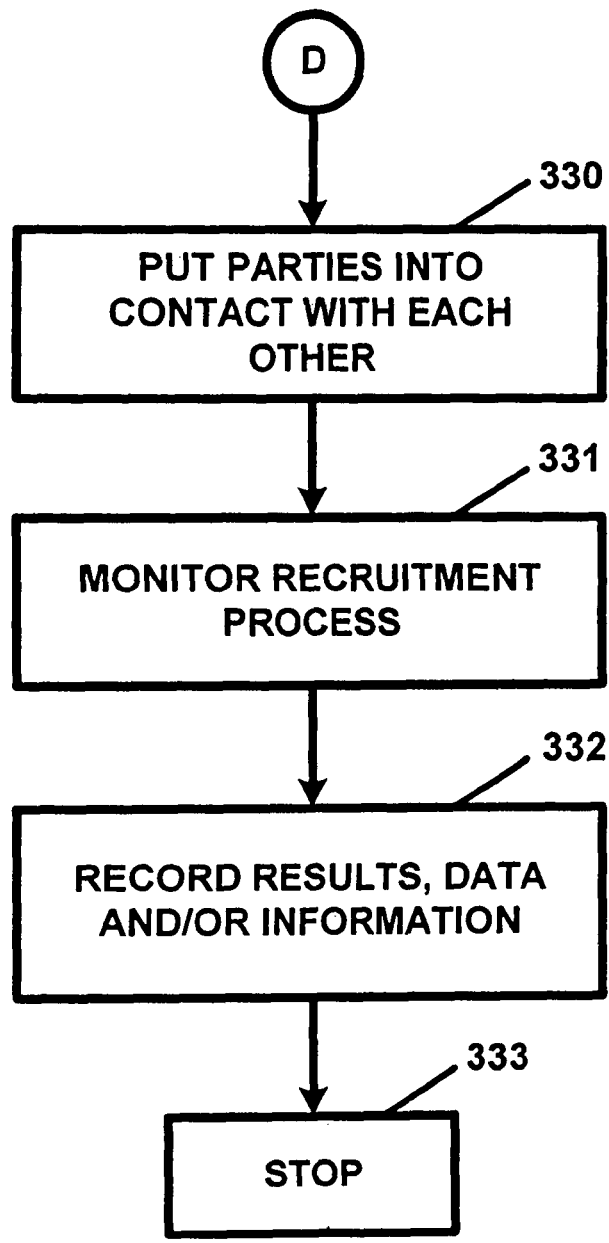

FIG. 4 illustrates the employer computer 30, in block diagram form. The employer computer 30, in the preferred embodiment, is a computer or computer system which is utilized to access and/or to communicate with the central processing computer 10. In the preferred embodiment, the employer computer 30 includes a central processing unit or CPU 30A, which in the preferred embodiment, is a microprocessor. The CPU 30A may also be a microcomputer, a minicomputer, a macro-computer, and/or a mainframe computer, depending upon the application.

The employer computer 30 also includes a random access memory device(s) 30B (RAM) and a read only memory device(s) 30C (ROM), each of which is connected to the CPU 30A, a user input device 30D, for entering data and/or commands into the employer computer 30, which includes any one or more of a keyboard, a scanner, a user pointing device, such as, for example, a mouse, a touch pad, and/or an audio input device and/or a video input device, etc., if desired, which input device(s) are also connected to the CPU 30A. The employer computer 30 also includes a display device 30E for displaying data and/or information to a user or operator.

The employer computer 30 also includes a transmitter(s) 30F, for transmitting signals and/or data and/or information to any one or more of the central processing computer(s) 10 and individual computer(s) 20. The employer computer 30 also includes a receiver 30G, for receiving signals and/or data and/or information from any one or more of the central processing computer(s) 10 and/or the individual computer(s) 20.

The employer computer 30 also includes a database(s) 30H which can contain any and/or all of the data and/or information described herein with regards to the database 10H of the central processing computer 10. The database 30H can also contain data and/or information concerning a particular employer and/or hiring entity and/or groups of employers and/or hiring entities, as well as data and/or information concerning the work schedule(s) and/or work calendar(s), including project schedules and/or calendars, for the employer and/or hiring entity, or groups thereof, for which the employer computer 30 is associated. This data and/or information can also include information concerning when the employer may be in need of individuals, independent contractors, and/or freelancers, and/or when the employer and/or hiring entity may not be in need of same.

With reference once again to FIG. 4, the employer computer 30 also includes an output device 30I such as a printer, a modem, a fax/modem, or other output device, for providing data and/or information to the operator or user of the individual computer 20 or to a third party or third party entity.

The databases 20H and 30H of the individual computer(s) 20 and the employer computer(s) 30, respectively, can contain any and/or all of the data and/or information which is stored and/or contained in the database 10H.

The database 10H, or collection of databases which form the database 10H, as well as any database 20H and/or 30H, and/or any other database(s) described herein, can be implemented by utilizing database software and/or spreadsheet software, such as, for example database software by Oracle®, Microsoft® Access® and/or Microsoft® Excel®, or any other suitable database or spreadsheet software programs and/or systems.

The data and/or information can be provided by the various employers, hiring entities, individuals, independent contractors, freelancers, applicants, recruiters, headhunters, third party intermediaries, and/or the operator and/or the administrator of the apparatus 100, and can be uploaded to, downloaded from, and/or be stored and/or be resident on any of the central processing computer(s) 10, the individual computer(s) 20, and/or the employer computer(s) 30.

In the preferred embodiment, wherein the apparatus 100 is utilized over the Internet and/or the World Wide Web, hyperlinks and/or other data and/or information links and/or linking methods and/or devices, can be utilized in order to provide an additional mechanism by which any of the individual computers 20 and/or any of the employer computers 30, can access and/or communicate with any other individual computer 20, employer computer 30 as well as the central processing computer. Any and/or all of the central processing computer 10, the individuals computers 20, and/or the employer computers 30, describe herein, can also be linked to, and/or can access and/or communicate with, any external computer, computer system, and/or information source (not shown), including, but not limited to, school registrar office computers, recruiter computers, employment agency computer, in order to access and/o obtain information therefrom.

The apparatus 100 and the method of the present invention can be utilized to perform various recruitment and/or recruitment-related services and/or functions. The present invention can be utilized by an individual, an independent contractor, and/or a freelancer, in order to search for, and/or to apply for, a job, a position, a project, and/or an assignment. The present invention can also be utilized by an employer and/or hiring entity in order to search for, and or to recruit, an individual, an independent contractor, and/or a freelancer, in order to fill a job, a position, a project, and/or an assignment.

The present invention can also be utilized by a recruiter, a headhunter, and/or a third party intermediary, in order to assist a respective individual, independent contractor, and/or freelancer, search for a job, a position, a project, and/or an assignment, as well as to assist an employer and/or a hiring entity to search for, and/or to recruit, an individual, an independent contractor, and/or a freelancer, in order to fill a job, a position, a project, and/or an assignment.

The data and/or information which is stored in the database 10H, as well as stored in any of the databases 20H and/or 30H, can be linked via any suitable data linking techniques such as, for example, dynamically linked lists (DLLs), linked lists, and object links embedded (OLE's).

In any and all of the embodiments described herein, each of the individual computers 20, the central processing computer(s) 10 and the employer computers 30 can communicate with one another via electronic submissions, electronic form submissions and/or transmissions, e-mail transmissions, facsimile transmissions, telephone messages, telephone calls, physical mail delivery, and/or via any other suitable communication technique, medium, or method.

In any and all of the embodiments described herein, employers and other hiring entities can post and/or list information regarding jobs, employment positions, temporary positions, assignments, freelance assignments, contracting assignments (hereinafter "jobs"), as well as any other assignments, projects, and/or efforts which require and/or which may require the services of individuals, independent contractors, freelancers, and/or temporary employees, etc.

Data and/or information regarding the above-described jobs, employment positions, assignments, etc., can be stored in the database 10H of the central processing computer 10. The data and/or information can also be stored in the database 20H of any individual computer 20 and/or in the database 30H of any employer computer 30.

Individuals, job applicants, prospective employees, employees, independent contractors, temporary workers, and/or freelancers, etc., can also post and/or list data and/or information regarding themselves with the database 10H of the central processing computer 10. As in the case with employers and/or hiring entities, data and/or information regarding these Individuals, job applicants, prospective employees, employees, independent contractors, temporary workers, and/or freelancers, etc., can also be stored in the database 20H of any individual computer 20 and/or in the database 30H of any employer computer 30.

Recruiters and/or other third party intermediaries described herein can also store data and/or information regarding any of the individuals, employers and/or hiring entities, whom they represent, which data and/or information can also be stored in the database 10H of the central processing computer 10 as well as the database 20h of the individual computer 20 and/or the database 30H of the employer computer 30. A recruiter or third party intermediary may utilize an individual computer 20 to access and/or utilize the present invention.

The apparatus and method of the present invention can be utilized in many preferred embodiments to provide job search services, recruitment services, and/or recruitment-related services. FIGS. 5A to 5E illustrate a preferred embodiment operation of the apparatus of FIG. 1, in flow diagram form. FIGS. 5A to 5E illustrate a method for using the apparatus 100, for assisting individuals, job applicants, prospective employees, employees, independent contractors, temporary workers, and/or freelancers, etc. (hereinafter referred to collectively as "individual" or "individuals"), to perform job searches, for employment positions, contracting jobs, temporary assignments and/or freelance assignments (hereinafter referred to as a "job" or "jobs").

The operation of the apparatus 100 commences at step 200. At step 201, the individual accesses the central processing computer 10 via the individual computer 30. The individual may, at step 202, enter data and/or information regarding his or her education, skills, work experience, objectives and/or any other data and/or information pertinent to a job search. Step 202 may be dispensed with if this information has been entered by the individual previously. The data and/or information can be entered specifically and/or generically. If entered specifically, the individual can also enter generic data and/or information to preserve confidentiality, if desired.

Data and/or information may also be entered into the central processing computer 10 by uploading and/or downloading, whichever the case may be, a resume and/or any other pertinent data and/or information. Data and/or information may also be obtained via a questionnaire which may be provided and/or answered on-line. Any and/or all of such data and/or information may be stored in the database 10H.

The central processing computer 10 can also process the specific data and/or information in order to convert and/or separately store same as generic data and/or information. Any and all data and/or information stored at step 202, and/or previously, can be stored in the database 10H of the central processing computer 10 and/or in the databases 20H and/or 30H, respectively, of the individual computer 20 and/or the employer computer 30, as appropriate. At step 203, the individual can choose to have the search proceed with specific data and/or information and/or generic data and/or information.

If, at step 204, it is determined that a search with specific data and/or information is selected, the central processing computer 10 will proceed to step 205 and proceed with the specific data and/or information. Thereafter, the operation will proceed to step 207. If, however, at step 204, it is determined that a search with specific data and/or information is not selected, the central processing computer 10 will proceed to step 206 and proceed with the generic and/or general data and/or information. Thereafter, the operation will proceed to step 207.

At step 207, the individual will enter his or her job search, including any search criteria, into the central processing computer 10 via the individual computer 20. At step 208, the central processing computer 10 will query the database of posted and/or listed jobs and generate a report or list of jobs which meet the individual's search criteria. At step 209, the central processing computer 10 will provide the individual with the report or list of available jobs either electronically and/or otherwise. The results of the search can also be provided to the individual by being displayed on the display device 20E and/or by being printed via the output device or printer 20I.

Thereafter, the individual will decide whether he or she wishes to apply for any of the jobs. At step 210, the individual can transmit information to the central processing computer 10 regarding which, if any, of the reported jobs he or she wishes to apply for. At step 211, the central processing computer 10 will determine whether the individual wants to apply for any of the reported jobs. If, at step 211, it is determined that the individual does not want to apply for any of the reported jobs, the central processing computer 10 will, at step 212, record and/or store any and/or all data and/or information regarding and/or pertinent to the search and/or the corresponding results, up to this point, including the actions of the individual. The operation of the apparatus 100 will thereafter cease at step 213.

If, at step 211, it is determined that the individual wants to apply for a reported job, the operation will proceed to step 214. At step 215, the individual data and/or information, whether specific, generic, and/or general, is transmitted to the employer and/or employer computer 30. Any data and/or information described as being transmitted between the parties, and/or between the respective computers, can be transmitted electronically, such as via e-mail, electronic message transmission, telephone call, telephone message, facsimile transmission, pager message, and/or physical mail delivery. The employer can review the data and/or information, at step 215, and transmit a response to the central processing computer 10 at step 216.

At step 217, the central processing computer 10 will process the employer's response and determine if the employer is interested in pursuing discussions with the individual. If, at step 217, it is determined that the employer is not interested in pursuing the individual, the central processing computer 10 will, at step 218, record and/or store any and/or all data and/or information regarding and/or pertinent to the search and/or the corresponding results, including information concerning the employer, the individual, the time and date of the consideration, along with any notes made by the employer or individual, up to this point.

The data and/or information stored at step 218 is stored in the database 10H for later use or reference by any individual, employer, and/or operator or administrator of the apparatus 100. Some or all of the data and/or information stored in the database 10H may thereafter be transmitted to, and/or stored in, the database(s) 20H and/or 30H of the respective individual computer(s) 20 and/or employer computer(s) 30. The operation of the apparatus 100 will thereafter cease at step 219.

If, at step 217, it is determined that the employer is interested in pursuing discussions with the individual, then the central processing computer 10 will, at step 220, notify the individual by transmitting a message to the individual, and/or to the individual computer 20 associated with the individual, so notifying the individual. The individual can review the data and/or information, at step 220, and transmit a response to the central processing computer 10 at step 221. If the employer's response had included a request for additional and/or more specific data and/or information, such as, but not limited to, a resume, references, work samples, salary requirements, salary history, transcripts, and/or requests for authorization to obtain any of the above, and/or any other information of interest to the employer, the individual's response, at step 221, can include same and/or links to same. The operation of the apparatus will thereafter proceed to step 222.

At step 222, the central processing computer 10 will determine whether the individual is interested in pursuing the opportunity with the employer. If at step 222, it is determined that the individual is not interested in pursing the opportunity, the central processing computer will, at step 223, record and/or store this information, along with any and/or all data and/or information regarding and/or pertinent to the search and/or the corresponding results, including information concerning the employer, the individual, the time and date of the consideration, along with any notes made by the employer or individual, up to this point. Thereafter, operation of the apparatus will cease at step 224.

If, at step 222, it is determined that the individual is interested in pursuing the opportunity, the data and/or information in the individual's response will, at step 225, be transmitted to the employer and/or the employer computer 30 associated with the employer. The employer can review the data and/or information, at step 225, and transmit a response to the central processing computer 10 at step 226. The response can include information as to whether the employer is interested in pursuing discussions with the individual.

At step 227, the central processing computer 10 will process the employer's response in order to determine if the employer is still interested in pursuing the opportunity regarding the individual. If, at step 227, it is determined that the employer is not interested in pursuing the opportunity regarding the individual, the central processing computer 10 will, at step 228, record and/or store this information, along with any and/or all data and/or information regarding and/or pertinent to the search and/or the corresponding results, including information concerning the employer, the individual, the time and date of the consideration, along with any notes made by the employer or individual, up to this point. Thereafter, the operation of the apparatus will cease at step 229.

If, at step 227, it is determined that the employer is interested in pursing the opportunity with the individual, the central processing computer 10 will, at step 230, put the employer and the individual in contact with each other by transmitting contact information to either or both of the employer and/or the individual. The contact information may include the individual's name, address, telephone number, fax number, e-mail, and/or any other contact information for the individual, and/or the employer's name, address, person to contact, contact individual at the employer, telephone number, fax number, e-mail, and/or any other contact information for the employer. The employer and the individual may thereafter proceed with the interview, employment screening, and/or recruitment, processes.

At step 231, the central processing computer 10 can monitor the interview, employment screening, and/or recruitment, processes, which take place between the employer and the individual. At step 232, the central processing computer 10 will record and/or store any and/or all data and/or information regarding and/or pertinent to the search and/or the corresponding results, including information concerning the employer, the individual, any information concerning whether a deal has been reached between the parties, any information concerning offers, counteroffers, rejected offers and/or rejected counteroffers, the time and date of the consideration, along with any notes made by the employer or individual, up to this point.

The data and/or information stored at step 232 is stored in the database 10H for later use or reference by any individual, employer, and/or operator or administrator of the apparatus 100. Some or all of the data and/or information stored in the database 10H may thereafter be transmitted to, and/or be stored in, the database(s) 20H and/or 30H of the respective individual computer(s) 20 and/or employer computer(s) 30. The operation of the apparatus 100 will thereafter cease at step 233.

The operation of the apparatus 100 may be terminated by either the individual and/or the employer at any time. In this manner, a party may terminate discussions at any time. The individual and/or the employer may also, at any time, obtain information about, and/or perform research on, the opposite party by linking to said information and/or research via the central processing computer 10 and/or via links and/or hyperlinks which can be inserted in the various e-mails and/or electronic messages which are utilized and/or transmitted in conjunction with the present invention. The information and/or research can be obtained without interrupting the processing of the central processing computer 10. In this manner, a party may obtain information and/or research about the opposite party, at any time, and without interrupting the processing of the central processing computer 10.

The present invention in another preferred embodiment, can be utilized by an employer and/or hiring entity in order to search for and/or recruit individuals for jobs, employment positions, temporary assignments, projects, and/or freelance assignments, and/or for any other need. FIGS. 6A to 6E illustrate another preferred embodiment operation of the apparatus of FIG. 1, in flow diagram form. FIGS. 6A to 6E illustrate a method for using the apparatus 100, for assisting employers and/or hiring entities (hereinafter referred to as "employer") in searching for and/or for recruiting job applicants, prospective employees, employees, independent contractors, temporary workers, and/or freelancers, etc. (hereinafter referred to collectively as "individual"), to fill jobs, employment positions, contracting jobs, temporary assignments, freelance assignments, and/or other needs.

The operation of the apparatus 100 commences at step 300. At step 301, the employer accesses the central processing computer 10 via the employer computer 30. The employer may, at step 302, enter data and/or information regarding its requirements and/or needs, including, but not limited to, those related to hiring needs, and/or its requirements concerning educational credentials, skills, work experience, objectives, and/or any other data and/or information pertinent to a fulfilling its needs. Step 302 may be dispensed with if this information has been entered by the employer previously. The data and/or information can be entered specifically and/or generically. If entered specifically, the employer can also enter generic data and/or information to preserve confidentiality, if desired.

Data and/or information may also be entered into the central processing computer 10 by uploading and/or downloading, whichever the case may be, job descriptions and/or hiring needs and/or any other pertinent data and/or information. Data and/or information may also be obtained via a questionnaire which may be provided and/or answered on-line. Any and/or all of such data and/or information may be stored in the database 10H.

The central processing computer 10 can also process the specific data and/or information in order to convert and/or separately store same as generic data and/or information. Any and all data and/or information stored at step 302, and/or previously, can be stored in the database 10H of the central processing computer 10 and/or in the databases 20H and/or 30H, respectively, of the individual computer 20 and/or the employer computer 30, as appropriate. At step 303, the employer can choose to have the search proceed with specific data and/or information and/or generic data and/or information.

If, at step 304, it is determined that a search with specific data and/or information is selected, the central processing computer 10 will proceed to step 305 and proceed with the specific data and/or information. Thereafter, the operation will proceed to step 307. If, however, at step 304, it is determined that a search with specific data and/or information is not selected, the central processing computer 10 will proceed to step 306 and proceed with the generic and/or general data and/or information. Thereafter, the operation will proceed to step 307.

At step 307, the employer will enter its recruitment search, including any search criteria, into the central processing computer 10 via the employer computer 30. At step 308, the central processing computer 10 will query the database of posted and/or listed individuals and generate a report or list of individuals who meet the employer's search criteria. At step 309, the central processing computer 10 will provide the employer with the report or list of available individuals either electronically and/or otherwise. The results of the search can also be provided to the employer by being displayed on the display device 30E and/or by being printed via the output device or printer 30I.

Thereafter, the employer will decide whether it wants to pursue any of the individuals identified in the search report. At step 310, the employer can transmit information to the central processing computer 10 regarding which, if any, of the reported individuals its wants to pursue. At step 311, the central processing computer 10 will determine whether the employer wants to pursue any of the individuals. If, at step 311, it is determined that the employer does not want to pursue any of the individuals, the central processing computer 10 will, at step 312, record and/or store any and/or all data and/or information regarding and/or pertinent to the search and/or the corresponding results, up to this point, including the actions of the employer. The operation of the apparatus 100 will thereafter cease at step 213.

If, at step 311, it is determined that the employer wants to pursue an individual, the operation will proceed to step 314. At step 315, the employer data and/or information, whether specific, generic, and/or general, is transmitted to the individual and/or individual computer 20. Any data and/or information described as being transmitted between the parties, and/or between the respective computers, can be transmitted electronically, such as via e-mail, electronic message transmission, telephone call, telephone message, facsimile transmission, pager message, and/or physical mail delivery. The individual can review the data and/or information, at step 315, and transmit a response to the central processing computer 10 at step 316.

At step 317, the central processing computer 10 will process the individual's response and determine if the individual is interested in pursuing discussions with the employer. If, at step 317, it is determined that the individual is not interested in pursuing the opportunity, the central processing computer 10 will, at step 318, record and/or store any and/or all data and/or information regarding and/or pertinent to the search and/or the corresponding results, including information concerning the employer, the individual, the time and date of the consideration, along with any notes made by the individual or employer, up to this point.

The data and/or information stored at step 318 is stored in the database 10H for later use or reference by any individual, employer, and/or operator or administrator of the apparatus 100. Some or all of the data and/or information stored in the database 10H may thereafter be transmitted to, and/or stored in, the database(s) 20H and/or 30H of the respective individual computer(s) 20 and/or employer computer(s) 30. The operation of the apparatus 100 will thereafter cease at step 319.

If, at step 317, it is determined that the individual is interested in pursuing discussions with the employer, then the central processing computer 10 will, at step 320, notify the employer by transmitting a message to the employer, and/or to the employer computer 30 associated with the employer, so notifying the employer. The employer can review the data and/or information, at step 320, and transmit a response to the central processing computer 10 at step 321. If the individual's response had included a request for additional and/or more specific data and/or information, such as, but not limited to, job description, firm resume, references, work samples, salary and benefits information, and/or requests for authorization to obtain any of the above, and/or any other information of interest to the individual, the employer's response, at step 321, can include same and/or links to same. The operation of the apparatus will thereafter proceed to step 322.

At step 322, the central processing computer 10 will determine whether the employer is interested in pursuing the opportunity with the individual. If at step 322, it is determined that the employer is not interested in pursing the opportunity, the central processing computer will, at step 323, record and/or store this information, along with any and/or all data and/or information regarding and/or pertinent to the search and/or the corresponding results, including information concerning the employer, the individual, the time and date of the consideration, along with any notes made by the employer or individual, up to this point. Thereafter, operation of the apparatus will cease at step 324.

If, at step 322, it is determined that the employer is interested in pursuing the opportunity, the data and/or information in the employer's response will, at step 325, be transmitted to the individual and/or the individual computer 20 associated with the individual. The individual can review the data and/or information, at step 325, and transmit a response to the central processing computer 10 at step 326. The response can include information as to whether the individual is interested in pursuing discussions with the employer.

At step 327, the central processing computer 10 will process the individual's response in order to determine if the individual is still interested in pursuing the opportunity. If, at step 327, it is determined that the individual is not interested in pursuing the opportunity regarding the employer, the central processing computer 10 will, at step 328, record and/or store this information, along with any and/or all data and/or information regarding and/or pertinent to the search and/or the corresponding results, including information concerning the employer, the individual, the time and date of the consideration, along with any notes made by the employer or individual, up to this point. Thereafter, the operation of the apparatus will cease at step 329.

If, at step 327, it is determined that the individual is interested in pursing the opportunity with the employer, the central processing computer 10 will, at step 330, put the individual and the employer in contact with each other by transmitting contact information to either or both of the individual and/or the employer. The contact information may include the employer's name, address, person to contact, contact individual at the employer, telephone number, fax number, e-mail, and/or any other contact information for the employer and/or the individual's name, address, telephone number, fax number, e-mail, and/or any other contact information for the individual. The employer and the individual may thereafter proceed with the interview, employment screening, and/or recruitment, processes.

At step 331, the central processing computer 10 can monitor the interview, employment screening, and/or recruitment, processes, which take place between the employer and the individual. At step 332, the central processing computer 10 will record and/or store any and/or all data and/or information regarding and/or pertinent to the search and/or the corresponding results, including information concerning the employer, the individual, any information concerning whether a deal has been reached between the parties, any information concerning offers, counteroffers, rejected offers and/or rejected counteroffers, the time and date of the consideration, along with any notes made by the employer or the individual, up to this point.

The data and/or information stored at step 332 is stored in the database 10H for later use or reference by any employer, individual, and/or operator or administrator of the apparatus 100. Some or all of the data and/or information stored in the database 10H may thereafter be transmitted to, and/or be stored in, the database(s) 20H and/or 30H of the respective individual computer(s) 20 and/or employer computer(s) 30. The operation of the apparatus 100 will thereafter cease at step 333.

The operation of the apparatus 100 may be terminated by either the employer and/or the individual at any time. In this manner, a party may terminate discussions at any time. The employer and/or the individual may also, at any time, obtain information about, and/or perform research on, the opposite party by linking to said information and/or research via the central processing computer 10 and/or via links and/or hyperlinks which can be inserted in the various e-mails and/or electronic messages which are utilized and/or transmitted in conjunction with the present invention. The information and/or research can be obtained without interrupting the processing of the central processing computer 10. In this manner, a party may obtain information and/or research about the opposite party, at any time, and without interrupting the processing of the central processing computer 10.

In another preferred embodiment, the present invention can be utilized to provide notification of job openings and/or job, contracting, freelancing, and/or temporary position, opportunities, to an individual an/or group of individuals. In this embodiment, the central processing computer 10 can be manually activated, automatically activated, and/or programmed for automatic activation, so as to perform searches of, and for, job openings and/or job, contracting, freelancing, and/or temporary position, opportunities, and provide an individual and/or group of individuals with notification of the availability of same.

Figure 7:
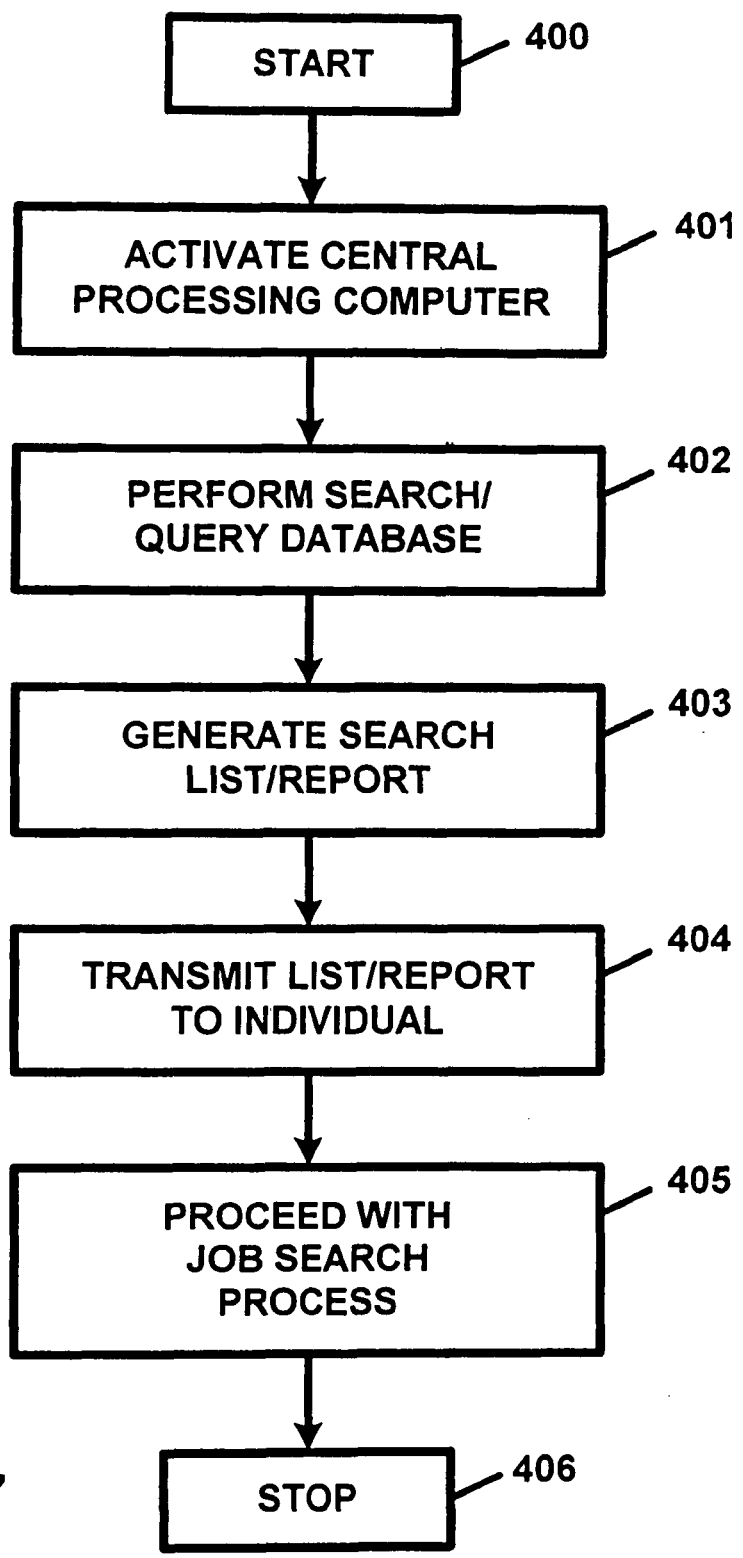
FIG. 7 illustrates another preferred embodiment operation of the apparatus of FIG. 1, in flow diagram form.

FIG. 7 illustrates another preferred embodiment operation of the apparatus of FIG. 1, in flow diagram form. In the embodiment of FIG. 7, the apparatus and method of the present invention is utilized so as to provide notification of job openings and/or job opportunities to an individual and/or a group of individuals. In this manner, the present invention can be utilized to inform an individual or individuals of job openings which may be of interest to him, her, or them, as the jobs or positions are posted and/or listed with the apparatus 100 by an employer and/or hiring entity.

In the embodiment of FIG. 7, an individual who desires to be notified of any of the herein described job openings, positions, assignments, contracts and/or projects, can list and/or provide their data and/or information, i.e., resume, educational qualifications, work experience, skills, references, work samples, and/or any other pertinent information, along with the type of job, work, project, and/or assignment, which they seek, with the apparatus 100 and, in particular, with the central processing computer 10, such as via the individual computer 20. Thereafter, the individual's data and/or information can be stored in the database 10H. Individuals posting or listing with the apparatus 100 may be subscribers, non-subscribers, and/or one-time and/or occasional or sporadic users of the apparatus 100.

The individual can also include information regarding the "searching event", the occurrence of which will trigger the central processing computer 10 to perform a job search for the individual and notify him or her of the results. The "searching event" can be pre-defined and/or be pre-specified as a date, a time, a time interval(s), a time period(s), events and/or occurrences.

The "searching event" can be requested by an individual, individuals, an employer, employers, a hiring entity or entities, and/or a recruiter, and may be defined as the occurrence of a new job posting by an employer and/or employers, upon the posting of new and/or revised data and/or information from an individual and/or group of individuals, upon a news release of certain business events, employment-related events, economic reports, industry-specific news, and/or any other event which may create an interest on behalf of an employer to fill a position, and/or for an individual to seek a position, and/or upon the occurrence of any recruitment initiating event, the happening of which will activate the central processing computer 10. The central processing computer 10 will thereafter proceed to perform a job search of employers and/or jobs in order to identify jobs or opportunities which may be of interest to, and/or which may be a possible match for, the individual.

The individual can also provide information such as a telephone number(s), a facsimile number(s), a pager number(s), an electronic mail (e-mail) address or e-mail addresses, and/or any other information which will facilitate a communication from the central processing computer 10 to the individual and/or the individual computer 20 associated with the individual. In this manner, the central processing computer 10 can communicate job openings and/or other opportunities which may be requested and/or which may be of interest to the individual. An employer can also provide similar, and/or analogous information to the central processing computer 10. Any and/or all of the data and/or information described herein as being provided by an individual, an employer, and/or a recruiter, can be stored in the database 10H.

In the embodiment of FIG. 7, the apparatus 100 can be programmed so as to trigger the central processing computer 10 to perform a job search for an individual and, in this manner, any programmed job search activity and/or recruitment activity will commence upon the occurrence of the "searching event".

The operation of the apparatus 100 commences at step 400. At step 401, the searching event will occur thereby activating the central processing computer 10. Thereafter, at step 402, the central processing computer 10 will query the database 10H in order to perform a job search for the individual. The central processing computer 10 will thereafter, at step 403, generate a list or report of available jobs and/or employers which may meet the individual's criteria, which may be of interest to the individual, and/or which may be a possible match for the individual.

At step 404, the list or report of jobs will be transmitted to the individual and/or to the individual computer 20 associated with the individual. The list or report can be transmitted electronically, such as via e-mail, electronic message transmission, telephone call, telephone message, facsimile transmission, pager message, and/or physical mail delivery.

At step 405, the job search process between the individual and the employer will then proceed in the manner described in steps 210 through 233 of FIG. 5, the description of which is hereby incorporated by reference herein. Thereafter, the operation of the apparatus 100 will cease at step 406.

In another preferred embodiment, the present invention can be utilized to provide notification of individuals, independent contractors, freelancers, and/or temporary workers, who are available for job openings, projects, freelance assignments, and/or temporary assignments, to an employer and/or hiring entity and/or to a group of employers and/or hiring entities. In this embodiment, the central processing computer 10 can be manually activated, automatically activated, and/or programmed for automatic activation, so as to perform searches of, and for, individuals who may be candidates to fill the job openings and/or the requirements of the employers and/or hiring entities and provide an employer and/or group of employers with notification of the availability of these individuals.

Figure 8:
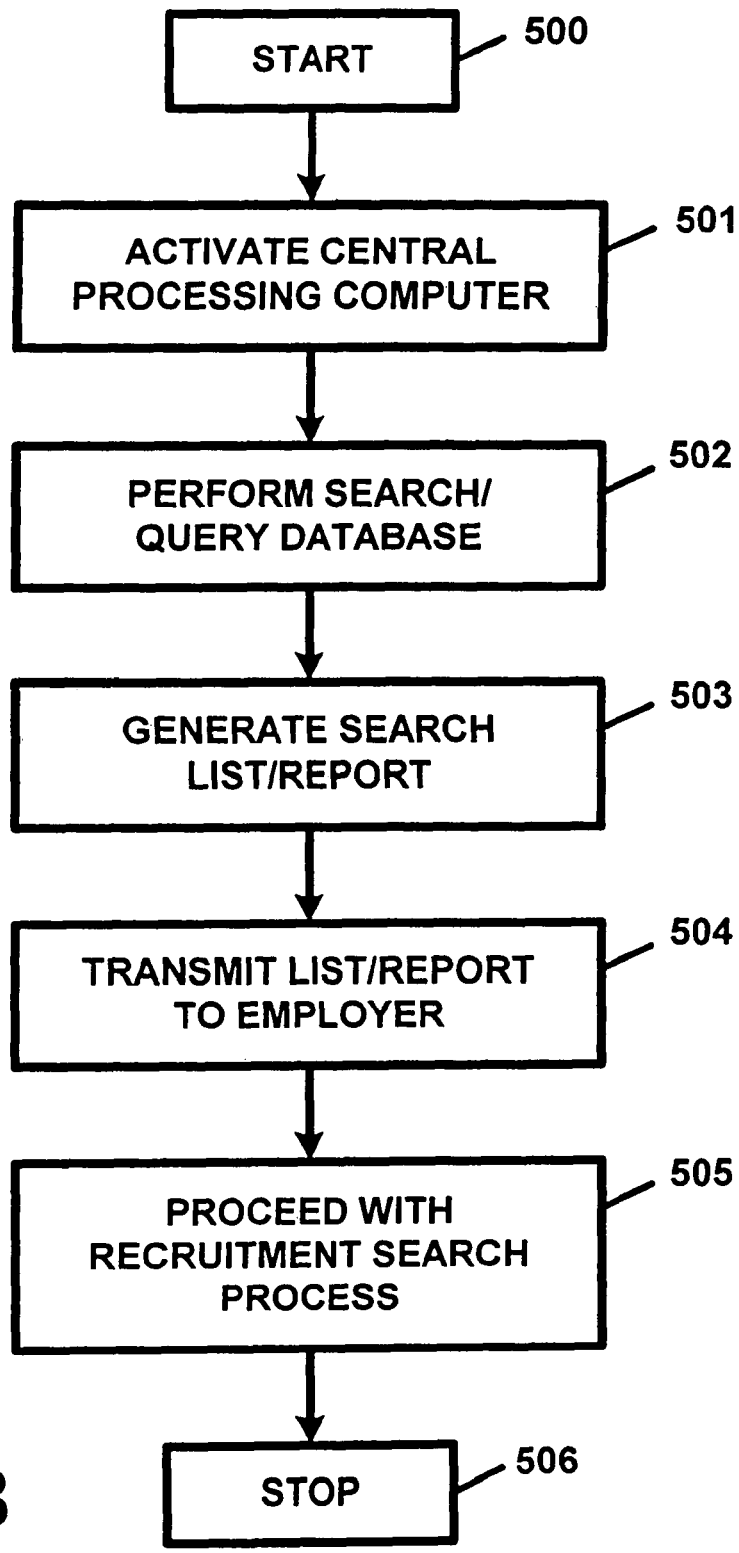
FIG. 8 illustrates another preferred embodiment operation of the apparatus of FIG. 1, in flow diagram form.

FIG. 8 illustrates another preferred embodiment operation of the apparatus of FIG. 1, in flow diagram form. In the embodiment of FIG. 8, the apparatus and method of the present invention is utilized so as to provide notification of individuals, who are available for applying for, and/or for interviewing for, job, job opportunities, and/or employer needs, to an employer and/or a group of employers. In this manner, the present invention can be utilized to inform an employer or employers of individuals whom may be candidates for, may be recruiting prospects for, and/or who may be interested in being notified about, any of the employer's jobs, job opportunities, and/or needs, which are posted and/or listed with the apparatus 100 by the employer or a representative.

In the embodiment of FIG. 8, an employer who desires to be notified of an individual or individuals, who may be qualified and/or interested in filling a job or position, can list and/or provide data and/or information, regarding the job openings, project openings, freelance assignments, and/or temporary assignments, including descriptions thereof, as well as the credentials required for filling and/or for being offered the respective job opening, project opening, freelance assignment, and/or temporary assignment, with the central processing computer 10.

The employer can also list and/or provide data and/or information about itself, a firm resume, salary structure, benefits packages, firm qualifications, firm references, work samples, and/or any other pertinent information, with the central processing computer 10, such as via the employer computer 30. Thereafter, the employer's data and/or information can be stored in the database 10H. Employers posting or listing jobs with the apparatus 100 may be subscribers, non-subscribers, and/or one-time and/or occasional or sporadic users of the apparatus 100.

The employer can also include information regarding the "searching event", the occurrence of which will trigger the central processing computer 10 to perform a recruitment search for the employer and notify the employer of the results. The "searching event" can be pre-defined and/or be pre-specified as a date, a time, a time interval(s), a time period(s), events and/or occurrences.

The "searching event" can be requested by an employer, employers, a hiring entity or entities, an individual, individuals, and/or a recruiter, and may be defined as the occurrence of a new job posting by an employer and/or employers, upon the posting of new and/or revised data and/or information from an individual and/or group of individuals, upon a news release of certain business events, employment-related events, economic reports, industry-specific news, and/or any other event which may create an interest on behalf of an employer to fill a position, and/or for an individual to seek a position, and/or upon the occurrence of any recruitment initiating event, the happening of which will activate the central processing computer 10. The central processing computer 10 will thereafter proceed to perform a recruitment search of individuals in order to identify individuals whom may be interested in, and/or whom may be a possible match for, the employer.

The employer can also provide information such as a telephone number(s), a facsimile number(s), a pager number(s), an electronic mail (e-mail) address or e-mail addresses, and/or any other information which will facilitate a communication from the central processing computer 10 to the employer and/or the employer computer 30 associated with the employer. In this manner, the central processing computer 10 can communicate information regarding an individual and/or individuals whom may be of interest to the employer. An individual can also provide similar, and/or analogous information to the central processing computer 10. Any and/or all of the data and/or information described herein as being provided by an employer, an individual, and/or a recruiter, can be stored in the database 10H.

In the embodiment of FIG. 8, the apparatus 100 can be programmed so as to trigger the central processing computer 10 to perform a recruitment search for an employer and, in this manner, any programmed recruitment search activity and/or recruitment activity will commence upon the occurrence of the "searching event".

The operation of the apparatus 100 commences at step 500. At step 501, the searching event will occur thereby activating the central processing computer 10. Thereafter, at step 502, the central processing computer 10 will query the database 10H in order to perform a recruitment search for the employer. The central processing computer 10 will thereafter, at step 503, generate a list or report of available individuals whom may meet the employer's criteria, which may be of interest to the employer, and/or which may be a possible match for the employer.

At step 504, the list or report of individuals will be transmitted to the employer and/or to the employer computer 30 associated with the employer. The list or report can be transmitted electronically, such as via e-mail, electronic message transmission, telephone call, telephone message, facsimile transmission, pager message, and/or physical mail delivery.

At step 505, the recruitment search process between the employer and the individual will then proceed in the manner described in steps 310 through 333 of FIGS. 6A to 6E, the description of which is hereby incorporated by reference herein. Thereafter, the operation of the apparatus 100 will cease at step 506.

In any and/or all of the embodiments described herein, any electronic messages, such as e-mails, electronic message transmissions, pager messages, telephone calls or messages, facsimile transmissions, etc., described herein, can be generated and/or transmitted to any of the respective parties, in real-time, thereby providing real-time message transmission and/or notification services.

In any and/or all of the embodiments described herein, any electronic messages, such as e-mails, electronic message transmissions, pager messages, telephone calls or messages, facsimile transmissions, etc., which are generated by the central processing computer 10, by the individual computer 20, and/or by the employer computer 30, may contain appropriate hyperlinks, and/or forwarding information, to the party sending the electronic message and/or e-mail, to a third party, to other information, and/or to another information source. In this manner, for example, an e-mail message, transmitted from and/or on behalf of an employer to an individual, can contain a hyperlink(s) to the employer's web site or web page.

The hyperlink(s) to the employer's web site or web page can provide the individual with a link to, and/or access to, information about the employer, links to a video presentation about the employer, the employer's departments, and/or any other information, video and/or photographs of the employer's facilities, information regarding certain employees, job descriptions, benefits, financial and operational data and/or information, salary information, travel-related service entities or travel agents for arranging travel to the employer for interview and/or other purposes, links to information sources regarding the locale and/or area where the employer is located, etc., and/or any other information which may be of interest to a job applicant and/or prospective employee.

Similarly, any electronic message and/or e-mail transmitted from and/or on the behalf of the individual can contain hyperlinks to additional data and/or information which may be of interest to the employer. This information may include the individual's resume, supplemental resume, supplemental information, references, letters of recommendation, links to the colleges, universities, and/or schools attended, links to pre-authorized letters/forms requesting transcripts from any schools attended, links to the registrar's office of the individual's schools, links to past employers, links to work samples, links to video presentations and/or a video clip of the individual and/or a photograph of the individual, and/or links to any other information which may be useful and/or desirable in the recruiting process.

In another preferred embodiment, including in any and/or all of the embodiments described herein, the present invention can be utilized in order to allow employers and/or hiring entities to bid for the services of individuals, independent contractors, temporary workers, and/or freelancers. In a similar and/or analogous manner, an individual, independent contractor, temporary worker, and/or freelancer, may offer and/or auction his, her, or its, services to employers and/or hiring entities. Applicant hereby incorporates by reference herein the subject matter of U.S. Provisional Patent Application Ser. No. 60/120,883 which teaches an apparatus and method for effectuating commerce in a network environment. Applicant also hereby incorporates by reference herein the subject matter of U.S. patent application Ser. No. 09/498,143 which teaches an apparatus and method for effectuating commerce in a network environment.

In this manner, bidding and auctioning activities, related to job search activities, recruitment activities, and/or recruitment-related activities, can be utilized in order to fill and/or to obtain any job, employment position, project, and/or assignment, described herein.

When utilized to perform bidding and/or auctioning activities, the respective employer or individual can direct their respective bidding activity or activities and/or auctioning activity or activities to any single, group of, and/or combination of any, party, parities, individual, individuals, employer, employers, and/or hiring entity or hiring entities. The bidding and/or auctioning activities can be directed to a party, parities, individual, individuals, employer, employers, and/or hiring entity or hiring entities, which may be specified by the respective initiating party and/or which may be obtained via any of the various search routines, described herein.

Any and/or all respective bidding activities and/or auctioning activities can be effected via e-mail messages, electronic message transmissions, pager messages, facsimile messages, telephone calls or messages, physical mail delivery, and/or via any other method, means and/or mode of communication.

Applicant hereby incorporates by reference herein the subject matter of U.S. Pat. No. 5,862,223 which teaches a method and apparatus for a cryptographically-assisted commercial network system designed to facilitate and support expert-based commerce; the subject matter of U.S. Pat. No. 5,797,127 which teaches a method, apparatus, and program for pricing, selling, and exercising options to purchase airline tickets; and U.S. Pat. No. 5,794,207 which teaches a method and apparatus for a cryptographically assisted commercial network system designed to facilitate buyer-driven conditional purchase offers.

Applicant also hereby incorporates by reference herein the subject matter of U.S. Pat. No. 5,884,272 which teaches a method and system for establishing and maintaining user-controlled anonymous communications; U.S. Pat. No. 5,884,270 which teaches a method and system for facilitating an employment search incorporating user-controlled anonymous communications; U.S. Pat. No. 5,832,497 which teaches an electronic automated information exchange and management system; U.S. Pat. No. 5,758,324 which teaches a resume storage and retrieval system; U.S. Pat. No. 5,696,702 which teaches a time and work tracker; U.S. Pat. No. 5,416,694 which teaches a computer-based data integration and management process for workforce planning and occupational readjustment; and U.S. Pat. No. 5,164,897 which teaches an automated method for selecting personnel matched job criteria.

In another preferred embodiment, including in any and/or all of the embodiments described herein, the present invention can be utilized for providing scheduling services for, and/or on behalf of, any of the individuals and/or employers described herein. In this embodiment, the present invention can maintain work schedules, and/or scheduling data and/or information, of and for individuals, independent contractors, temporary workers, and/or freelancers. The present invention can also maintain the work schedules, and/or scheduling data and/or information, of and for employers and/or hiring entities, including dates and/or times when the employer and/or hiring entity will, or may, be in need of help or assistance which can be provided by any of the individuals, independent contractors, temporary workers, and/or freelancers described herein.

The above-described schedules, and/or scheduling data and/or information, can be stored in the database 10H of the central processing computer 10. The schedules, and/or scheduling data and/or information, can also be stored and/or provided at any of the respective individual computers 20 and/or employer computers 30 described herein, and/or may be stored in any of the respective databases 20H and/or 30H.

An employer may utilize the schedules and/or scheduling data and/or information in order to reserve, engage, and/or request, the services of an individual. An employer can access the central processing computer 10 and access data and/or information concerning the work schedules of a certain individual and/or the work schedules of any number of individuals. The individual or individuals may be identified via a recruitment search as described herein and/or may be an individual and/or individuals already known by the employer and/or recommended to the employer. The employer may review the schedules and/or scheduling data and/or information until it identifies an individual and/or individuals who is or are acceptable and available for the dates and/or times, as well as places, needed by the employer.

Once the employer locates an individual and/or individuals, the employer can reserve, engage, and/or request, the services of the individual or individuals by transmitting an appropriate message from the employer computer 30 to the central processing computer 10. The message can include the amount which the employer is willing to pay for the individual's services. Thereafter, the central processing computer 10 will transmit a message to the individual computer(s) 20 associated with the individual or individuals, and/or otherwise notify the individual or individual.

The individual or individuals may receive the message in real-time and/or otherwise. The individual or individuals may thereafter confirm the reservation, agree to the engagement, and/or reply to the request, respectively, via transmitting a message from the individual computer 20 to the central processing computer 10. Thereafter, the central processing computer 10 will transmit a message to the employer computer 30 of the employer, thereby notifying the employer of the confirmed reservation, the confirmed agreement to the engagement, and/or the reply, respectively. Thereafter, the employer and the individual or individuals can be put into contact with one another and/or contact one another as they see fit.

In another embodiment, the central processing computer 10 can be programmed to confirm a reservation, agree to an engagement, and/or issue a reply, respectively, for, or on behalf, of an individual or individuals.

In another preferred embodiment, the central processing computer 10 can be programmed to provide an employer with conditions under which the individual and/or individuals will agree to a reservation, an engagement, and/or a request. One of these conditions can include payment in advance, a down payment, and/or an option payment, for the services of the individual or individuals. In this embodiment, the central processing computer 10 can administer and/or maintain a financial account for, or on behalf of any of, the individuals and/or employers described herein. The financial accounts may be bank accounts, electronic money accounts, credit accounts, debit account, and/or any other accounts for facilitating financial transactions. The central processing computer 10 can make a payment and/or transfer, on behalf of an employer, from the employer's account, to an individual's account or to accounts of individuals, thereby receiving payment for, or on behalf of, the individual or individuals, whichever the case may be.

As noted above, the employer may also secure and/or reserve the services of an individual, by purchasing an option from the individual, or person or entity representing the individual, for the respective individual's services, with the price of said option being determined by using conventional financial options pricing models and/or methods. Applicant hereby incorporates by reference herein the subject matter of *Options, Futures, and Other Derivatives*, Third Edition, by John C. Hull, Prentice Hall, 1997.

An individual may utilize the schedules and/or scheduling data and/or information in order to offer services to an employer. An individual can access the central processing computer 10 and access data and/or information concerning the work schedules or needs of an employer or any number of employers. The employer or employers may be identified via a job search as described herein and/or may be an employer and/or employers already known by the individual and/or recommended to the individual. The individual may review the schedules and/or scheduling data and/or information, until it identifies an employer and/or employers may be in need of the individual's services.

Once the individual locates an employer and/or employers, the individual can offer the individual's services to the employer or employers by transmitting an appropriate message from the individual computer 20 to the central processing computer 10. The message or offer can include the individual's fee or the amount of charge for the services. Thereafter, the central processing computer 10 will transmit a message to the employer computer(s) 30 associated with the employer or employers, and/or otherwise notify the employer or employers.

The employer or employers may receive the message in real-time and/or otherwise. The employer or employers may thereafter accept or reject the offer via transmitting a message from the employer computer 30 to the central processing computer 10. Thereafter, the central processing computer 10 will transmit a message to the individual computer 20 of the individual, thereby notifying the individual of the acceptance or rejection of its offer. Thereafter, the individual and the employer or employers can be put into contact with one another and/or contact one another as they see fit.

In another embodiment, the central processing computer 10 can be programmed to accept or reject, an offer to provide services, for, or on behalf, of an employer or employers.

In another preferred embodiment, the central processing computer 10 can be programmed to provide an individual with conditions under which the employer and/or employers will accept an offer. One of these conditions can be that a bond or guarantee must be posted for guaranteeing that the services will be performed as agreed upon. In this embodiment, the central processing computer 10 can administer and/or maintain a financial account for, or on behalf of any of, the individuals and/or employers described herein.

The financial accounts may be bank accounts, electronic money accounts, credit accounts, debit account, and/or any other accounts for facilitating financial transactions. The central processing computer 10 can make a payment and/or transfer, on behalf of an individual, from the individual's account, to an employer's account or to accounts of employers, thereby receiving payment for, or on behalf of, the employer or employers, whichever the case may be.

The individual may also secure a job, position, project, and/or assignment, by purchasing an option for same from the employer, or a representative of the employer, with the price of said option being determined by using conventional financial options pricing models and/or methods.

In another preferred embodiment, as well as in any and/or all of the embodiments described herein, the present invention can generate electronic catalogs and/or electronic coupons for use by employers, to publicize and/or to advertise jobs, employment positions, projects and/or assignments, which they wish to fill, and/or by individuals, employment agencies and/or their agents and/or representatives, to publicize and/or to advertise their services, and/or the services of those who they represent, as well as their respective availability and/or desire to perform and/or to fill and/or assume a job, employment position, project and/or assignment.

In this manner, an employer can generate and/or distribute electronic catalogs and/or electronic coupons, thereby publicizing and/or advertising any jobs, positions, projects and/or assignments, and electronically distribute same to individuals and/or employment agencies who or which can be identified by querying the database 10H and/or by utilizing any other appropriate search method and/or criteria. Individuals, and/or their representative(s), and/or employment agencies, may generate and/or distribute electronic catalogs and/or electronic coupons in order to publicize and/or to advertise the individual's credentials, services, availability, and/or desire, to fill or assume a job, position, project, and/or assignment, to employers and/or hiring entities.

Applicant hereby incorporates by reference herein the subject matter and teachings of U.S. Provisional Patent Application Ser. No. 60/137,689 which teaches an apparatus and method for providing an electronic catalog and/or an electronic coupon. Applicant also hereby incorporates by reference herein the subject matter and teachings of U.S. patent application Ser. No. 09/579,358 which teaches an apparatus and method for providing an electronic catalog and/or an electronic coupon.

Any and/or all of the electronic catalogs and/or electronic coupons described herein can be generated and/or transmitted as e-mail messages and/or electronic message transmissions and can include text information, resume information, video information and/or audio information.

Any and/or all of the electronic catalogs and/or electronic coupons described herein can be generated automatically by the central processing computer 10 and/or by any individual computers 20 and/or employer computers 30. Any of the central processing computer 10, the individual computer(s) 20 and/or the employer computer(s) 30 can be programmed to generate and/or to transmit any of the e-mails, electronic message transmissions, electronic catalogs and/or electronic coupons described herein.

In another preferred embodiment, the apparatus and method of the present invention can be utilized for performing and/or for facilitating the provision of recruitment services for schools, colleges, universities, and/or any organizations of any kind. In this embodiment, information in the form of text messages, video messages, audio messages, video clips, audio clips, infomercials, electronic catalogs, e-mail messages, etc., for publicizing and/or for promoting any of the herein-described schools, colleges, universities, and/or any organizations of any kind, can be stored at the central processing computer 10 and can be provided to any individuals who or which utilizes the apparatus and method of the present invention.

The apparatus and method of the present invention can also provide and/or facilitate the provision of any of the herein-described recruiting and/or recruitment services for attracting individuals to, and/or recruiting individuals for, any of the respective schools, colleges, universities, and/or any organizations of any kind.

Any and/or all of the e-mails, electronic message transmissions, electronic catalogs and/or electronic coupons, described herein, can be generated, transmitted and/or distributed, in response to a posting of a new job, a new employment position, a new project, and/or a new assignment, a listing and/or a posting of an individual(s), changes to the employment status, resume, skills, educational status, etc., of an individual(s), the occurrence of an event concerning the economy, the work needs of individuals, the needs of employers and/or hiring entities, and/or at specific times, at specified time intervals, and/or upon the occurrence of any event and/or occurrence which can be the basis for initiating a job search and/or a recruitment search.

In another preferred embodiment, as well as in any of the embodiments described herein, intelligent agents, software agents, mobile agents, and/or related technologies, can be utilized in conjunction with the present invention. The respective intelligent agent(s), software agent(s), mobile agent(s), (hereinafter referred to collectively as "intelligent agent" or "intelligent agents") can be programmed and/or designed to act on behalf of a respective individual, employer and/or hiring entity, so as to perform any of the job searches, recruitment searches, and/or any of the other activities and/or functions described herein. The intelligent agent can act on behalf of the individual, employer and/or hiring entity, in various related interactions, negotiations, and/or other activities which are described as being performed herein and/or which may be incidental and/or related thereto.

An individual can utilize an intelligent agent(s) in order to find, identify, and/or locate a job, position, project and/or assignment. In a similar and/or an analogous manner, the employer and/or hiring entity can utilize an intelligent agent(s) in order to find and/or locate individuals to fill a job, position, project and/or assignment.

Applicant hereby incorporates by reference herein the subject matter of the *Agent Sourcebook, A Complete Guide to Desktop, Internet and Intranet Agents*, by Alper Caglayan and Colin Harrison, Wiley Computer Publishing, 1997. Applicant also incorporates by reference herein the subject matter of *Cool Intelligent Agents For The Net*, by Leslie L. Lesnick with Ralph E. Moore, IDG Books Worldwide, Inc. 1997.

In any and/or all of the embodiments described herein, the present invention can provide links and/or hyperlinks, on-line, on-screen, in e-mail messages and/or in electronic message transmissions, and/or otherwise, to any and/or all products and/or services related to job searching and/or recruiting. For example, the present invention can provide links to information regarding the location of an employer, links to a travel agent, links to transportation companies, rental car companies, hotels and other lodging establishments, as well as links to resume services, employment agencies, recruiters, temporary agencies, etc.

The present invention can also provide links to attorneys, banks, financial institutions, insurance companies, bonding companies, etc., and/or other individuals and/or entities, the services of whom or which may be needed and/or may be recommended when hiring an individual, an independent contractor, a temporary worker, and/or a freelancer, and/or when accepting and/or assuming responsibility, respectively, for a job, a position, a project and/or an assignment.

The present invention can also provide for the automatic notification of job openings, position openings, projects, and/or assignments, the availability of individuals, job applicants, independent contractors, and/or freelancers, and/or the availability of goods and/or service providers, to any of the respective parties described herein who may utilize the present invention.

In another preferred embodiment, as well as in any and/or all of the embodiments described herein, the present invention can provide an individual, employer and/or hiring entity, with data and/or information concerning attrition rates at individual employers and/or hiring entities, as well as salary information, including salary surveys for particular jobs, professions, etc., including salary, benefits, and/or other compensation, data and/or information for various experience levels, skill levels, skills and abilities, educational credentials, and/or other data and/or information which may be utilized by the individuals, employers and/or employer entities, and/or recruiters, described herein.

The above-described data and/or information can be provided by job or profession type, by market sector, by type of employer, and/or by location and/or geographic region. For example, an individual may utilize the data and/or information provided by the present invention in order to determine what compensation the market will bear for his or her credentials and/or skill levels. An employer can also utilize this information in order to be competitive in its recruitment efforts and/or for otherwise attracting talented individuals.

The present invention can also provide an individual, an employer and/or hiring entity, and/or a recruiter, with data and/or information regarding the latest developments and/or current developments in the employment and/or recruiting fields, including, but not limited to, growth areas, demand information for certain jobs and/or professions, etc. For example, an individual can utilize this information in order to determine whether retraining is needed in order to attain a certain position and/or to ascertain the latest growth areas for certain jobs, careers and/or professions. An employer can utilize this information in order to determine the state of the job market and utilize the information as it sees fit.

The present invention can also be utilized in order to provide notification to any of the individuals, employers and/or hiring entities, described herein, that information is being, and/or has been, requested about them. The present invention can also provide the identity of the requesting party to the respective individual, employer and/or hiring entity. For example, an individual can be notified that company A has requested information about him or her. Similarly, an employer can be notified that an individual and/or a certain individual has requested information about it. The present invention may also maintain any and/or all information requests as confidential, if so requested.

In this embodiment, any and/or all of the data and/or information described herein, may be provided, requested, and/or accessed, by any of the respective parties. Any such notification embodiments can also provide for the blockage of any such notification by a requesting party. Also, any and/or all information utilized and/or provided in any such notification embodiments can also be provided as group information, generic information, and/or as information representative of a group, or a trend.

In any and/or all of the embodiments described herein, the present invention can also provide data and/or information, which may be transmitted and/or provided to any of the respective individuals, employers and/or hiring entities, to any number of, or groups of, third party or other individuals, employers, and/or hiring entities.

The present invention can be utilized by any individual, employer and/or hiring entity. The present invention can also be utilized by a recruiter, a recruiting entity, a headhunter, an agent, an employment agency, etc., in representing an individual, an independent contractor, and/or a freelancer. For example, a recruiter can utilize the present invention in order to assist others in finding jobs, positions, projects and/or assignments, and/or to assist employers and/or hiring entities to find individuals to fill jobs, positions, projects and/or assignments.

The present invention can also be utilized in order to prevent certain individuals and/or entities, employers and/or hiring entities, from accessing the data and/or information about any other individual, entity, employer, and/or hiring entity. For example, an individual can prevent access, to his or her data and/or information, by a present employer, a past employer, and/or any other individual, entity, employer and/or hiring entity identified by the individual, specifically, generically, and/or generally. In this manner, an individual can prevent a present employer and/or any other individual, entity, employer and/or hiring entity, from learning about his or her job search and/or availability. Similarly, an employer and/or hiring entity can prevent certain individuals, entities, employers, and/or hiring entities, from learning of its recruitment efforts and/or human resource and/or employment needs.

Access restrictions to any data and/or information can be effected by utilizing any data and/or information security and/or access prevention methods, technologies and/or techniques, known by those skilled in the pertinent arts.

In any and/or all of the herein-described embodiments, the operation of the present invention may be triggered by any type of pre-specified event and/or occurrence which may include a new individual listing, a new employer and/or hiring entity listing, a departure of an individual from the employ of another, the completion of a job, project and/or assignment, changes in an economic factor(s), changes in a market factor(s), an increase in an unemployment rate, the unemployment of an individual, a detected need for jobs of a certain skill, and/or any other event, situation, and/or occurrence which may be pertinent and/or related to job searching efforts and/or recruitment efforts.

The apparatus of the present invention, in any and/or all of the embodiments described herein, can also be programmed to be self-activating and/or activated automatically.

The apparatus of the present invention can also be programmed in order to automatically generate and/or transmit any of the e-mails, electronic message transmissions, electronic notification transmissions, and/or any of the communications, which are described herein, between any of the parties which utilize the present invention.

In another preferred embodiment, as well as in any and/or all of the embodiments described herein, the present invention can be utilized in order to monitor, record, and/or keep track of, any offers and/or rejections of offers, involving any jobs, employment positions, projects and/or assignments, which occur in conjunction with and/or via use of the present invention. The information which is obtained can thereafter be provided to individuals, employers, and/or recruiters, for utilization in any appropriate and/or suitable manner.

In any and/or all of the embodiments described herein, any individual and/or employer data and/or information can be stored with various and/or varying levels of specificity and/or confidentiality. In this manner, any of the data and/or information described herein, can be filtered, can be released at varying times, depending upon the interest and/or comfort levels of the parties, and/or can be maintained as confidential. In this manner, the respective parties can maintain confidentiality and/or can exercise control over the nature and amount of data and/or information which can be released about themselves.

The apparatus and/or method of the present invention can be utilized as an electronic and/or network-based job searching and/or recruitment searching apparatus and/or clearinghouse. Applicant hereby incorporates by reference herein the subject matter of U.S. Provisional Patent Application Ser. No. 60/132,301 which teaches an apparatus and method for monitoring an advertisement and/or an advertisement location.

In any and/or all of the embodiments described herein, any interactions, negotiations, and/or deals reached, between any of the parties, can be monitored and/or be recorded by the central processing computer 10 and be stored in the database 10H. In this regard, any interviews, interactions, communications, actions and responses thereto, offers, counter-offers, acceptances and/or rejections, can be recorded and/or be stored and utilized in any manner consistent with the operation and/or use of the present invention as described herein.

The present invention, in any and/or all of the herein-described embodiments, can utilize electronic commerce technologies and security methods, techniques and technologies, as described and as set forth in *Electronic Commerce Technical, Business, and Legal Issues*, Nabil R. Adam, et al. Prentice Hall, 1999 and *Web Security & Commerce*, Simson Garfinkel with Gene Spafford, O'Reilly 1997, the subject matter of which are hereby incorporated by reference herein.

The communications networks and/or systems on, or over, which the present invention may be utilized, can include any one or combination of telecommunication networks or systems, satellite communication networks or systems, radio communication networks or systems, digital communication networks or systems, digital satellite communication networks or systems, personal communications services networks or systems, cable television networks or systems, broadband communication networks or systems, low earth orbiting satellite (LEDs) networks or systems, as well as in, or on any internets and/or intranets, the Internet, the World Wide Web, and any other suitable communication network or system.

Any and/or all of the data and/or information described herein can be compiled and processed using statistical calculations in order to update the stored data and/or information with such data and/or information being made available to the respective individuals, employers and/or hiring entities, who or which utilize the present invention.

Any and/or all of the data and/or information described herein, which is stored in the database 10H, or in the collection of databases, can be linked via relational database techniques and/or via any appropriate database management techniques. The data and/or information, in the preferred embodiments, can be updated via inputs from the respective individuals, employers and/or hiring entities, and/or administrator or operator of the apparatus 100 and/or the central processing computer 10. The above-described updates can also be provided from other information sources via the communication network.

The data and/or information stored in the database 10H, or in the collection of databases, and/or any other databases utilized in conjunction with the present invention, can be updated by each of the respective individuals, employers and/or hiring entities, and/or administrator or operator of the apparatus 100 or the central processing computer 10, in real-time, and/or via dynamically linked database management techniques.

The data and/or information which is stored in the database 10H and/or which may be otherwise utilized with, and/or in conjunction with, the apparatus and method of the present invention, can be linked via any suitable data linking techniques such as, for example, dynamically linked lists (DLLs), linked lists, and object links embedded (OLE's). Any suitable database management technique(s) may also be utilized in conjunction with the present invention.

The present invention can be utilized in conjunction with job searches, recruitment searches, and/or related activities, for any kind of job, service, vocation, profession, employment position, independent contractor project, project, free-lance assignment, assignment, and/or any other kind or variety of work or services, permanent and/or temporary, and/or regardless of duration and/or type.

The present invention provides an apparatus and a method for providing automated job searching services, recruitment services, and/or employment agent and/or agency services, in a network environment, while reducing the time, expense and effort needed in performing these services.

The present invention can also be utilized in conjunction with electronic catalogs and/or electronic coupons in order to provide electronic catalogs and/or electronic coupons containing information regarding any of the job search applicants, prospective employees, independent contractors, employers, assignments, available jobs or positions, contract positions, contracting assignments, employment agency services, and/or other individuals and/or entities described herein, so as to advertise the availability or existence of the respective individuals and/or entities. Applicant hereby incorporates by reference herein the subject matter and teachings of U.S. Provisional Patent Application Ser. No. 60/137,689 entitled "APPARATUS AND METHOD FOR PROVIDING AN ELECTRONIC CATALOG AND/OR AN ELECTRONIC COUPON". Applicant hereby incorporates by reference herein the subject matter and teachings of U.S. patent application Ser. No. 09/579,358 entitled "APPARATUS AND METHOD FOR PROVIDING AN ELECTRONIC CATALOG AND/OR AN ELECTRONIC COUPON".

The present invention can be utilized in conjunction with any job, assignment, position, employment position, service, contracting assignment, and/or any independent contracting position and/or freelance position, which can be the subject of commerce.

The present invention can be utilized, in any and/or all of the embodiments described herein, in conjunction with the buying, selling, bartering and/or trading, of services between the various parties, individuals, employers, and/or hiring entities described herein.

The present invention can be utilized in order to reduce recruiting efforts, costs and fees, such as headhunter fees, agency fees, broker fees, and/or representative fees, and can eliminate the inefficiencies which may result from dealing with intermediaries in job search efforts and/or recruitment efforts.

The present invention also provides an apparatus and a method for providing enhanced confidentiality during job search activities, assignment search activities, recruitment activities, and/or related activities, interactions, negotiations and/or other dealings, between the respective parties involved.

While the present invention has been described and illustrated in various preferred and alternate embodiments, such descriptions are merely illustrative of the present invention and are not to be construed to be limitations thereof. In this regard, the present invention encompasses all modifications, variations and/or alternate embodiments, with the scope of the present invention being limited only by the claims which follow.

What is claimed is:

1. An apparatus, comprising:
a memory device or a database, wherein the memory device or the database stores work schedule information or scheduling information of or for a plurality of individuals, independent contractors, temporary workers, or freelancers;
a receiver, wherein the receiver receives a first request, wherein the first request contains information regarding a request to obtain work schedule information or scheduling information of or for an individual, an independent contractor, a temporary worker, or a freelancer, from among the plurality of individuals, independent contractors, temporary workers, or freelancers, wherein the first request is received from a first communication device associated with an employer or a hiring entity;
a processor, wherein the processor is associated with a website, and further wherein the processor is specially programmed to process or to provide job search information, recruitment information, or recruitment-related information, wherein the processor processes information contained in the first request, wherein the processor or the apparatus generates a first message in response to the first request, and wherein the first message contains the work schedule information or the scheduling information of or for the individual, the independent contractor, the temporary worker, or the freelancer; and
a transmitter, wherein the transmitter transmits the first message to the first communication device on, over, or via, the Internet or the World Wide Web, wherein the apparatus receives a second request, wherein the second request contains information for reserving, engaging, or requesting, the services of the individual, the independent contractor, the temporary worker, or the freelancer,
wherein the apparatus processes the information contained in the second request and generates a second message containing information regarding the second request, and further wherein the apparatus transmits the second message to a second communication device, wherein the second communication device is associated with the individual, the independent contractor, the temporary worker, or the freelancer.

2. The apparatus of claim 1, wherein the second request contains information regarding an amount the employer or the hiring entity is willing to pay the individual, the independent contractor, the temporary worker, or the freelancer.

3. The apparatus of claim 1, wherein the apparatus receives a reply message transmitted from the second communication device, wherein the reply message contains information regarding a confirmation of a reservation associated with reserving the services of the individual, the independent contractor, the temporary worker, or the freelancer, an agreement to an engagement associated with engaging the services of the individual, the independent contractor, the temporary worker, or the freelancer, or a reply to the request, wherein the apparatus transmits a second reply message to the first communication device, wherein the second reply message contains information regarding a confirmed reservation associated with a reserving of the services of the individual, the independent contractor, the temporary worker, or the freelancer, a confirmed agreement associated with an engaging of the services of the individual, the independent contractor, the temporary worker, or the freelancer, or the reply to the request.

4. The apparatus of claim 1, wherein the apparatus is programmed to confirm a reservation, to agree to an engagement, or to issue a reply, for or on behalf of the individual, the independent contractor, the temporary worker, or the freelancer.

5. The apparatus of claim 1, wherein the apparatus automatically generates a third message containing information regarding a posting of a job, a position, a project, or an assignment, by an employer or a hiring entity, and further wherein the apparatus transmits the third message to the second communication device or to a third communication device associated with the individual, the independent contractor, the temporary worker, or the freelancer, or the third communication device is associated with a second individual, a second independent contractor, a second temporary worker, or a second freelancer.

6. The apparatus of claim 1, wherein the apparatus automatically generates a third message containing information regarding a posting of new or revised data or information by an individual, an independent contractor, a temporary worker, or a freelancer, and further wherein the apparatus transmits the third message to the first communication device or to a third communication device associated with the employer or the hiring entity, or the third communication device is associated with a second employer or a second hiring entity.

7. The apparatus of claim 1, wherein the second message contains a hyperlink or a link to a web site of the employer or hiring entity, information about the employer or the hiring entity, a video presentation about the employer or the hiring entity, or information regarding a job description.

8. The apparatus of claim 1, wherein the apparatus processes information regarding a search to identify the individual or a second individual, the independent contractor or a second independent contractor, the temporary worker or a second temporary worker, or the freelancer or a second freelancer, to perform a job, a position, a project, or an assignment.

9. The apparatus of claim 1, wherein the first message is transmitted as or in an e-mail message or an electronic message transmission, and further wherein the first message or the second message contains information regarding a resume, a supplemental resume, supplemental information, a reference, a letter of recommendation, a link to a college, university, or school, attended, a link to a pre-authorized letter or form requesting a transcript from a school attended, a link to a registrar's office of a school, a link to a past employer, a link to a work sample, a link to a video presentation or a video clip, or a photograph, of, for, or regarding, the individual, the independent contractor, the temporary worker, or the freelancer.

10. An apparatus, comprising:
a memory device or a database, wherein the memory device or the database stores work schedule information or scheduling information of or for a plurality of employers or hiring entities;
a receiver, wherein the receiver receives a first request, wherein the first request contains information regarding a request to obtain work schedule information or scheduling information of or for an employer or a hiring entity from among the plurality of employers or hiring entities, wherein the first request is received from a first communication device associated with an individual, an independent contractor, a temporary worker, or a freelancer;
a processor, wherein the processor is associated with a website, and further wherein the processor is specially programmed to process or to provide job search information, recruitment information, or recruitment-related information, wherein the processor processes information contained in the first request, wherein the processor or the apparatus generates a first message in response to the first request, and wherein the first message contains the work schedule information or the scheduling information of or for the employer or the hiring entity; and
a transmitter, wherein the transmitter transmits the first message to the first communication device on, over, or via, the Internet or the World Wide Web, wherein the apparatus receives a second request, wherein the second request contains information regarding a request to provide a service or services to or for the employer or the hiring entity,
wherein the apparatus processes the information contained in the second request and generates a second message containing information regarding the second request, and further wherein the apparatus transmits the second message to a second communication device, wherein the second communication device is associated with the employer or the hiring entity.

11. The apparatus of claim 10, wherein the second request contains information regarding an amount the individual, the independent contractor, the temporary worker, or the freelancer, is willing to charge the employer or the hiring entity.

12. The apparatus of claim 10, wherein the apparatus receives a reply message transmitted from the second communication device, wherein the reply message contains information regarding a confirmation of an agreement to hire the individual, the independent contractor, the temporary worker, or the freelancer, an agreement to an engagement associated with engaging the services of the individual, the independent contractor, the temporary worker, or the freelancer, wherein the apparatus transmits a second reply message to the first communication device, wherein the second reply message contains information regarding a confirmed hiring of the individual, the independent contractor, the temporary worker, or the freelancer, or a confirmed agreement associated with an engaging of the services of the individual, the independent contractor, the temporary worker, or the freelancer.

13. The apparatus of claim 10, wherein the apparatus is programmed to confirm a hiring by the employer or the hiring entity, to agree to an engagement, or to issue a reply, for or on behalf of the employer or the hiring entity.

14. The apparatus of claim 10, wherein the apparatus automatically generates a third message containing information regarding a posting of new or revised information regarding the individual, the independent contractor, the temporary worker, or the freelancer, and further wherein the apparatus transmits the third message to the second communication device or to a third communication device associated with the employer or the hiring entity, or the third communication device is associated with a second employer or a second hiring entity.

15. The apparatus of claim 10, wherein the apparatus automatically generates a third message containing information regarding a posting of new or revised data or information by an employer or a hiring entity, and further wherein the apparatus transmits the third message to the first communication device or to a third communication device associated with the individual, the independent contractor, the temporary worker, or the freelancer, or the third communication device is associated with a second individual, a second independent contractor, a second temporary worker, or a second freelancer.

16. The apparatus of claim 10, wherein the second message contains a hyperlink or a link to a web site of the individual, the independent contractor, the temporary worker, or the freelancer.

17. The apparatus of claim 10, wherein the apparatus processes information regarding a search to identify the employer or a second employer, or the hiring entity or a second hiring entity, in need of provider of a service or services.

18. The apparatus of claim 10, wherein the first message is transmitted as or in an e-mail message or an electronic message transmission, and further wherein the first message or the second message contains information regarding information about the employer or hiring entity, a link to a video presentation about the employer or hiring entity, a video or a photograph of the facilities of the employer or the hiring entity, information regarding employees, job descriptions, benefits, financial and operational data or information, salary information, or, for, or regarding, the employer or hiring entity, or a link to information regarding a locale or area where the employer or hiring entity is located.

19. An apparatus, comprising:
- a memory device or a database, wherein the memory device or the database stores work schedule information or scheduling information of or for an individual, an independent contractor, a temporary worker, or a freelancer;
- an input device or a receiver, wherein the input device inputs, or the receiver receives, a first request, wherein the first request contains information regarding a request to obtain work schedule information or scheduling information of or for the individual, the independent contractor, the temporary worker, or the freelancer, wherein the first request is received from a first communication device associated with an employer or a hiring entity;
- a processor, wherein the processor is associated with a website, and further wherein the processor is specially programmed to process or to provide job search information, recruitment information, or recruitment-related information, wherein the processor processes information contained in the first request, wherein the processor or the apparatus generates a first message in response to the first request, and wherein the first message contains the work schedule information or the scheduling information of or for the individual, the independent contractor, the temporary worker, or the freelancer; and
- a transmitter, wherein the transmitter transmits the first message to the first communication device on, over, or via, the Internet or the World Wide Web, wherein the apparatus receives a second request, wherein the second request contains information for reserving, engaging, or requesting, the services of the individual, the independent contractor, the temporary worker, or the freelancer.

20. The apparatus of claim 19, wherein the apparatus processes information regarding a search to identify the individual or a second individual, the independent contractor or a second independent contractor, the temporary worker or a second temporary worker, or the freelancer or a second freelancer, to perform a job, a position, a project, or an assignment.

21. The apparatus of claim 19, wherein the first message is transmitted as or in an e-mail message or an electronic message transmission, and further wherein the first message contains information regarding a resume, a supplemental resume, supplemental information, a reference, a letter of recommendation, a link to a college, university, or school, attended, a link to a pre-authorized letter or form requesting a transcript from a school attended, a link to a registrar's office of a school, a link to a past employer, a link to a work sample, a link to a video presentation or a video clip, or a photograph, of, for, or regarding, the individual, the independent contractor, the temporary worker, or the freelancer.

* * * * *